US008462266B2

(12) United States Patent
Ueno et al.

(10) Patent No.: US 8,462,266 B2
(45) Date of Patent: Jun. 11, 2013

(54) IMAGE PROCESSING DEVICE AND METHOD, AND IMAGE DISPLAY DEVICE AND METHOD

(75) Inventors: Masafumi Ueno, Osaka (JP); Kenichiroh Yamamoto, Osaka (JP); Takashi Yoshii, Osaka (JP); Hiroyuki Furukawa, Osaka (JP); Yasuhiro Yoshida, Osaka (JP); Ikuko Tsubaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 852 days.

(21) Appl. No.: 12/529,994

(22) PCT Filed: Apr. 18, 2008

(86) PCT No.: PCT/JP2008/057626
§ 371 (c)(1),
(2), (4) Date: Sep. 4, 2009

(87) PCT Pub. No.: WO2008/136286
PCT Pub. Date: Nov. 13, 2008

(65) Prior Publication Data
US 2010/0091185 A1 Apr. 15, 2010

(30) Foreign Application Priority Data

Apr. 27, 2007 (JP) ................................. 2007-118108
Mar. 3, 2008 (JP) ................................. 2008-051919

(51) Int. Cl.
*H04N 7/01* (2006.01)
*H04N 11/20* (2006.01)

(52) U.S. Cl.
USPC ........... 348/452; 348/441; 348/443; 348/458; 348/459

(58) Field of Classification Search
USPC ....................................................... 348/452
See application file for complete search history.

(56) References Cited

U.S. PATENT DOCUMENTS 4,733,300 A 3/1988 Sugiyama et al.
5,268,759 A 12/1993 Kishimoto et al.
(Continued)

FOREIGN PATENT DOCUMENTS

| AU | 2004-200237 A1 | 8/2004 |
|---|---|---|
| EP | 0647919 A1 | 4/1995 |

(Continued)

OTHER PUBLICATIONS

English computer machine translation of JP-11-69313-A.

(Continued)

*Primary Examiner* — Brian Yenke
(74) *Attorney, Agent, or Firm* — Birch, Stewart, Kolasch & Birch, LLP

(57) ABSTRACT

An image processing device and method, and an image display device and method which realizes a high-definition displayed video by reducing motion blur caused by a holding-type display system and reducing motion blurs of the displayed video caused by the time integration effect of an image sensor while suppressing deterioration of an image. The image display device includes a motion vector detection section (101) which detects a motion vector in each predetermined region between the frames of an inputted image signal, and an edge emphasis part (2) which emphasizes the high-frequency component of the inputted image signal and an interpolated image signal generated by an FRC part (100) according to the motion amount of the inputted image signal detected by the motion vector detection section (101). This compensates the high-frequency component attenuated by the time integration effect of the image sensor to reduce the apparent motion blurs to improve the sharpness of the displayed image. By making the degree of edge emphasis of the interpolated image signal smaller than that of the inputted image signal, the sharpness of the displayed image is improved without making the image deterioration of the interpolated image signal distinct.

14 Claims, 14 Drawing Sheets

U.S. PATENT DOCUMENTS

| | | | |
|---|---|---|---|
| 5,757,432 A * | 5/1998 | Dulong et al. | 348/384.1 |
| 6,037,986 A * | 3/2000 | Zhang et al. | 375/240.12 |
| 6,650,792 B1 | 11/2003 | Aida et al. | |
| 6,930,752 B2 * | 8/2005 | Baba et al. | 352/38 |
| 7,206,027 B2 * | 4/2007 | De Haan et al. | 348/448 |
| 7,265,741 B2 * | 9/2007 | Kumamoto et al. | 345/99 |
| 7,643,019 B2 * | 1/2010 | Velthoven et al. | 345/204 |
| 8,189,105 B2 * | 5/2012 | Jiang et al. | 348/452 |
| 2004/0062450 A1 | 4/2004 | Kondo et al. | |
| 2004/0130661 A1 * | 7/2004 | Jiang | 348/459 |
| 2004/0160577 A1 * | 8/2004 | Baba et al. | 352/38 |
| 2005/0018077 A1 * | 1/2005 | De Haan et al. | 348/458 |
| 2005/0105617 A1 | 5/2005 | Chono | |
| 2005/0190164 A1 * | 9/2005 | Velthoven et al. | 345/204 |
| 2006/0061690 A1 * | 3/2006 | De Haan et al. | 348/625 |
| 2007/0046821 A1 * | 3/2007 | Mead et al. | 348/571 |
| 2007/0070221 A1 * | 3/2007 | Nishi et al. | 348/241 |
| 2008/0285645 A1 * | 11/2008 | Bock et al. | 375/240.03 |

FOREIGN PATENT DOCUMENTS

| | | | |
|---|---|---|---|
| EP | 1 357 750 A2 | 10/2003 | |
| EP | 1 422 928 A2 | 5/2004 | |
| JP | 62-135081 A | 6/1987 | |
| JP | 3-190473 A | 8/1991 | |
| JP | 4-45671 A | 2/1992 | |
| JP | 11-69313 A | 3/1999 | |
| JP | 3295437 B2 | 6/2002 | |
| JP | 2002-373330 A | 12/2002 | |
| JP | 2005-51460 A | 2/2005 | |
| JP | 2006-332904 A | 12/2006 | |
| KR | 10-2004-0070487 A | 8/2004 | |
| RU | 2222873 C2 | 7/2002 | |
| SU | 1425872 A1 | 9/1988 | |

OTHER PUBLICATIONS

English Computer Machine Translation of JP-2006-332904.

Richardson, "Video Compression: Video Coding for Next Generation Multimedia," Moscow, 2005, pp. 240-244.

Ishiguro et al., "Consideration on Motion Picture Quality of the Hold Type Display with an octuple-rate CRT", Technical Report of IEICE, The Institute of Electronics, Information and Communication Engineers, EID96-4 (Jun. 1996), pp. 19-26.

Yamauchi, "TV Standards Conversion", Journal of the Institute of Television Enginners of Japan, vol. 45, No. 12, pp. 1534-1543, 1991.

* cited by examiner

FIG. 7
(a)
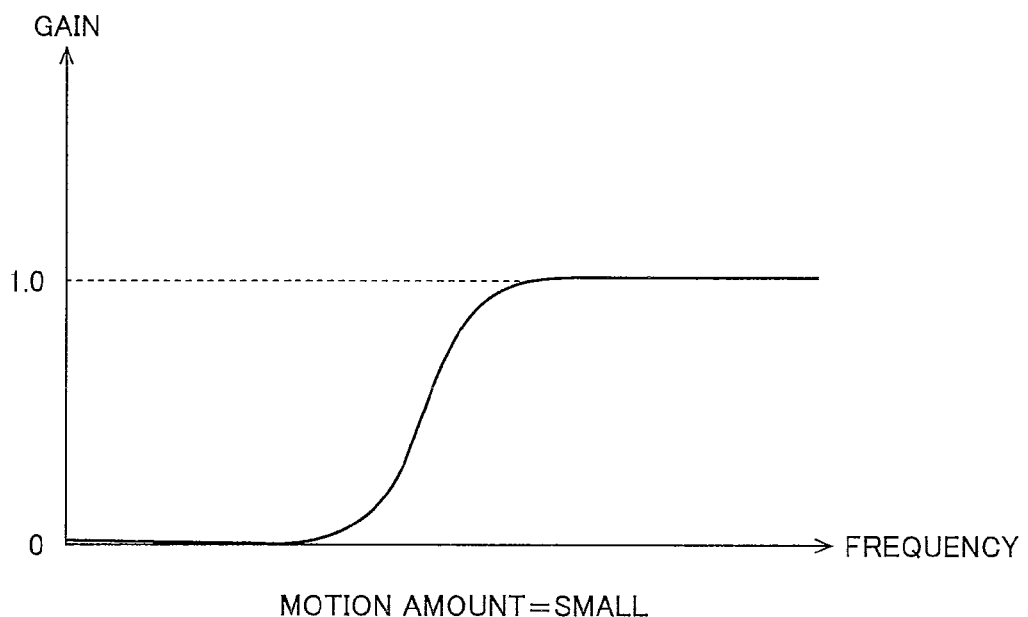
MOTION AMOUNT=SMALL
(b)
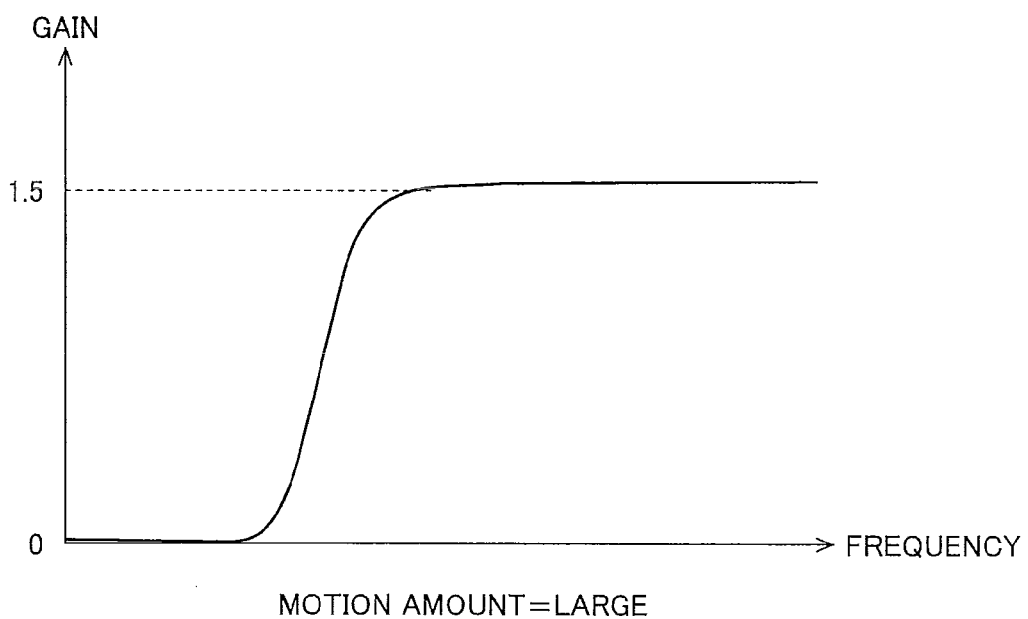
MOTION AMOUNT=LARGE

FIG. 9
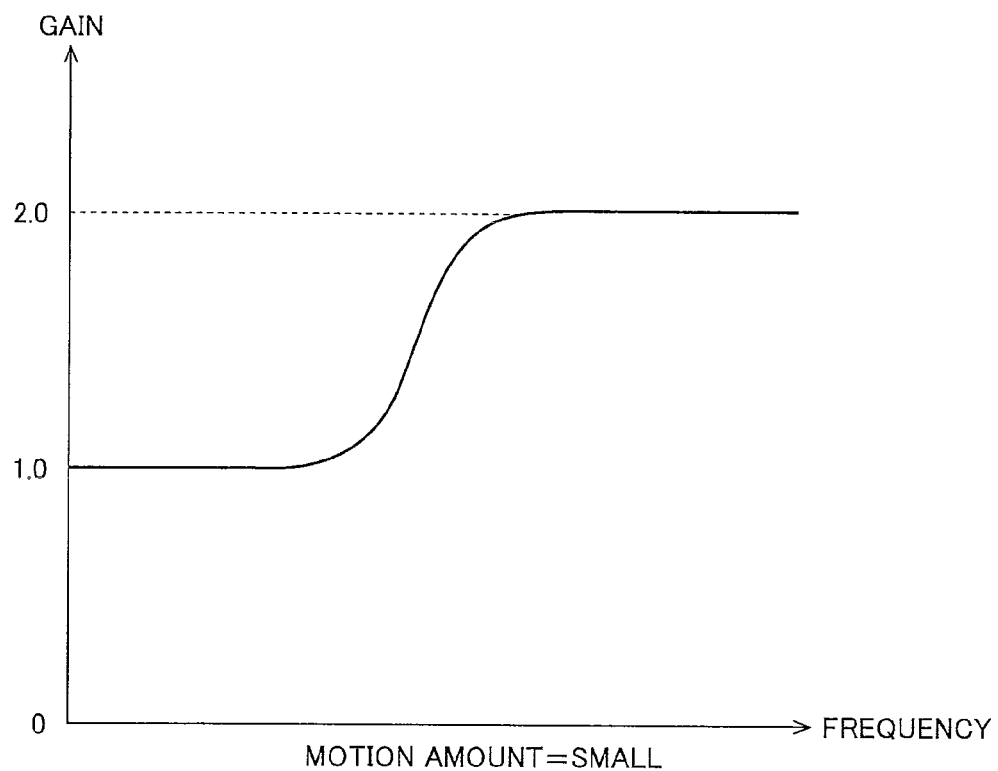
(a)
MOTION AMOUNT=SMALL
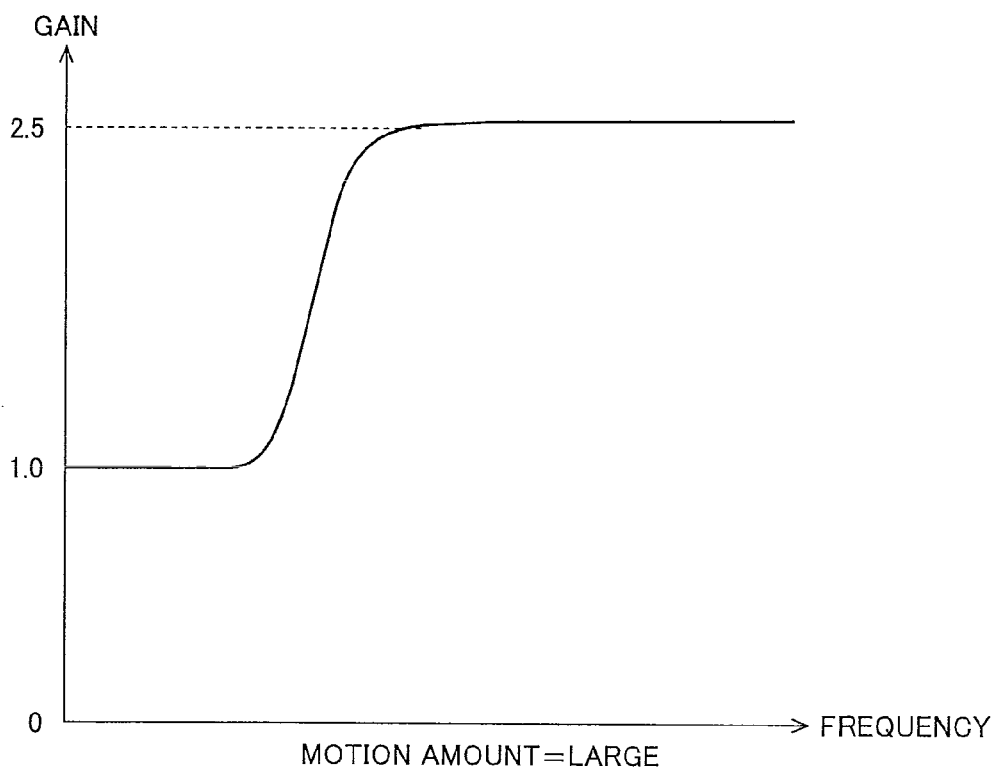
(b)
MOTION AMOUNT=LARGE

IMAGE PROCESSING DEVICE AND METHOD, AND IMAGE DISPLAY DEVICE AND METHOD

TECHNICAL FIELD

The present invention relates to an image display device and an image display method of the device and an image processing device and an image processing method of the device capable of presenting a high-definition displayed video by reducing motion blurs of a displayed video due to the time integration effect of an image sensor.

BACKGROUND OF THE INVENTION

As compared to conventional cathode-ray tubes (CRTs) primarily used for realizing moving images, LCDs (Liquid Crystal Displays) have a drawback, so-called motion blur, which is the blurring of outline of a moving portion perceived by a viewer when displaying an image with movement. It is indicated that this motion blur arises from the LCD display system itself (see e.g., Specification of Japanese Patent No. 3295437; "Hidekazu Ishiguro and Taiichiro Kurita, "Consideration on Motion Picture Quality of the Hold Type Display with an octuple-rate CRT", IEICE Technical Report, Institute of Electronics, Information and Communication Engineers, EID96-4 (1996-06), p. 19-26").

Since fluorescent material is scanned by an electron beam to cause emission of light for display in CRTs, the light emission of each pixel is basically impulse-like although slight afterglow of the fluorescent material exists. This is called an impulse-type display system. On the other hand, in the case of LCDs, an electric charge accumulated by applying an electric field to liquid crystal is retained at a relatively high rate until the next electric field is applied. Especially, in the case of the TFT system, since a TFT switch is disposed for each dot configuring a pixel and usually each pixel is provided with an auxiliary capacity, the ability to retain the accumulated charge is extremely high. Therefore, the light emission is continued until the pixels are rewritten by the application of the electric field based on the image information of the next frame or field (hereinafter, represented by the frame). This is called a holding-type display system.

Since the impulse response of the image displaying light has a temporal spread in the above holding-type display system, special frequency characteristics deteriorate as temporal frequency characteristics deteriorate, and the motion blur occurs. Since the human eye can smoothly follow a moving object, if the light emission time is long as in the case of the holding type, the movement of image looks jerky and unnatural due to the time integration effects.

To improve the motion blur in the above holding-type display system, a technique for converting a frame rate (number of frames) by interpolating an image between frames is known. This technique is called FRC (Frame Rate Converter) and is put to practical use in liquid crystal display devices, etc.

Conventionally known methods of converting the frame rate include various techniques such as simply repeating readout of the same frame for a plurality of times and frame interpolation using linear interpolation between frames (see e.g., Tatsuro Yamauchi, "TV Standards Conversion", Journal of the Institute of Television Engineers of Japan, Vol. 45, No. 12, pp. 1534-1543 (1991)). However, in the case of the frame interpolation processing using the linear interpolation, unnaturalness of motion (jerkiness, judder) is generated due to the frame rate conversion, and the motion blur disturbance due to the holding-type display system cannot sufficiently be improved, resulting in inadequate image quality.

To eliminate effects of the jerkiness, etc., and improve quality of moving images, a motion-compensated frame interpolation processing using motion vectors has been proposed. Since a moving image itself is captured to compensate the image movement in this process, highly natural moving images may be acquired without deteriorating the resolution and generating the jerkiness. Since interpolation image signals are generated with motion compensation, the motion blur disturbance due to the above holding-type display system may sufficiently be improved.

Above Specification of Japanese Patent No. 3295437 discloses a technology of motion-adaptively generating interpolation frames to increase a frame frequency of a displayed image for improving deterioration of spatial frequency characteristics causing the motion blur. In this case, at least one interpolation image signal interpolated between frames of a displayed image is motion-adaptively created from the previous and subsequent frames, and the created interpolation image signals are interpolated between the frames and are sequentially displayed.

FIG. 1 is a block diagram of a schematic configuration of an FRC drive display circuit in a conventional liquid crystal display device and, in FIG. 1, the FRC drive display circuit includes an FRC portion 100 that converts the number of frames of the input image signal by interpolating the image signals subjected to the motion compensation processing between frames of the input video signal, an active-matrix liquid crystal display panel 203 having a liquid crystal layer and an electrode for applying the scan signal and the data signal to the liquid crystal layer, and an electrode driving portion 204 for driving a scan electrode and a data electrode of the liquid crystal display panel 203 based on the image signal subjected to the frame rate conversion by the FRC portion 100.

The FRC portion 100 includes a motion vector detecting portion 101 that detects motion vector information from the input image signal and an interpolation frame generating portion 102 that generates interpolation frames based on the motion vector information acquired by the motion vector detecting portion 101.

In the above configuration, for example, the motion vector detecting portion 101 may obtain the motion vector information with the use of a block matching method, a gradient method, etc., or if the motion vector information is included in the input image signal in some form, this information may be utilized. For example, the image data compression-encoded with the use of the MPEG format includes motion vector information of a moving image calculated at the time of encoding, and this motion vector information may be acquired.

FIG. 2 is a diagram for explaining frame rate conversion processing by the conventional FRC drive display circuit shown in FIG. 1. The FRC portion 100 generates interpolation frames (gray-colored images in FIG. 2) between frames with the motion compensation processing using the motion vector information output from the motion vector detecting portion 101 and sequentially outputs the generated interpolation signals along with the input frame signals to perform processing for converting the frame rate of the input image signal from 60 frames per second (60 Hz) to 120 frames per second (120 Hz).

FIG. 3 is a diagram for explaining an interpolation frame generation processing of the motion vector detecting portion 101 and the interpolation frame generating portion 102. The motion vector detecting portion 101 uses the gradient method to detect a motion vector 205 from, for example, a frame #1 and a frame #2 shown in FIG. 2. The motion vector detecting portion 101 obtains the motion vector 205 by measuring a direction and an amount of movement in 1/60 of a second between the frame #1 and the frame #2. The interpolation frame generating portion 102 then uses the obtained motion vector 205 to allocate an interpolation vector 206 between the frame #1 and the frame #2. An interpolation frame 207 is generated by moving an object (in this case, an automobile) from a position of the frame #1 to a position after 1/120 of a second based on the interpolation vector 206.

By performing the motion-compensated frame interpolation processing with the use of the motion vector information to increase a display frame frequency in this way, the display state of the LCD (the holding-type display system) can be made closer to the display state of the CRT (the impulse-type display system) and the image quality deterioration may be improved which is due to the motion blur generated when displaying a moving image.

In the motion-compensated frame interpolation processing, it is essential to detect the motion vectors for the motion compensation. For example, the block matching method and the gradient method are proposed as representative techniques for the motion vector detection. In the gradient method, the motion vector is detected for each pixel or small block between two consecutive frames to interpolate each pixel or small block of the interpolation frame between two frames. An image at an arbitrary position between two frames is interpolated at an accurately compensated position to convert the number of frames.

Although the image quality deterioration due to the motion blur caused by the holding-type display may be improved by performing the motion-compensated frame interpolation processing to increase a display frame frequency as above, the input image signal may include motion blurs due to the time integration effect of an image sensor (also called a camera blur), and the image quality is deteriorated by the motion blurs due to the time integration effect of an image sensor. Therefore, for example, a proposal has been made in Japanese Laid-Open Patent Publication No. 2002-373330 for an image processing device removing the motion blurs due to the time integration effect of an image sensor and increasing the feeling resolution without making images unnatural. The conventional image processing device described in Japanese Laid-Open Patent Publication No. 2002-373330 will hereinafter be described with reference to FIG. 4.

FIG. 4 is a functional block diagram of a configuration of a conventional image processing device. An input image supplied to the image processing device is supplied to an object extracting portion 111, an area identifying portion 113, a mixture ratio calculating portion 114, and a foreground/background separating portion 115. The object extracting portion 111 roughly extracts an image object corresponding to a foreground object included in the input image and supplies the extracted image object to a motion detecting portion 112. For example, the object extracting portion 111 roughly extract the image object corresponding to the foreground object by detecting the contour of the image object corresponding to the foreground object included in the input image.

The object extracting portion 111 roughly extracts an image object corresponding to a background object included in the input image and supplies the extracted image object to the motion detecting portion 112. For example, the object extracting portion 111 roughly extracts the image object corresponding to the background object from a difference between the input image and the image object corresponding to the extracted foreground object. For example, the object extracting portion 111 may roughly extract the image object corresponding to the foreground object and the image object corresponding to the background object from a difference between a background image stored in a background memory disposed inside and the input image.

The motion detecting portion 112 uses methods such as a block matching method, a gradient method, a phase correlation method, and a pel-recursive method to calculate a motion vector of the roughly extracted image object corresponding to the foreground object and supplies the calculated motion vector and the position information of the motion vector (information identifying a position of a pixel corresponding to the motion vector) to the area identifying portion 113 and a motion blur removing portion 116. The motion vector output by the motion detecting portion 112 includes information corresponding to a motion amount v. For example, the motion detecting portion 112 may output a motion vector of each of the image objects to the motion blur removing portion 116 along with the pixel position information identifying pixels for the image objects.

The motion amount v is a value representative of a change in a position of an image corresponding to a moving object on the basis of a pixel interval. For example, if an image of an object corresponding to the foreground moves to be displayed at a position four pixels away in the next frame based on a certain frame, the motion amount v of the image of the object corresponding to the foreground is represented by four.

The area identifying portion 113 identifies the respective pixels of the input image as a foreground area, a background area, and a mixture area and supplies information (hereinafter, area information) indicative of which of the foreground area, the background area, or the mixture area each of the pixels belongs to, to the mixture ratio calculating portion 114, the foreground/background separating portion 115, and the motion blur removing portion 116.

The mixture ratio calculating portion 114 calculates a mixture ratio (hereinafter, a mixture ratio $\alpha$) corresponding to the pixels included in the mixture area based on the input image and the area information supplied from the area identifying portion 113 and supplies the calculated mixture ratio to the foreground/background separating portion 115. The mixture ratio $\alpha$ is a value indicative of a rate of an image component (hereinafter, also referred to as a background component) corresponding to the background objects.

The foreground/background separating portion 115 separates the input image into a foreground component image consisting only of image components (hereinafter, also referred to as foreground components) corresponding to the foreground objects and a background component image consisting only of background components based on the area information supplied from the area identifying portion 113 and the mixture ratio $\alpha$ supplied from the mixture ratio calculating portion 114 and supplies the foreground component image to the motion blur removing portion 116 and the background component image to a correcting portion 117.

The motion blur removing portion 116 determines a unit of processing indicative of one or more pixels included in the foreground component image based on the motion amount v known from the motion vector and the area information. The unit of processing is data that specifies a group of pixels to be processed for adjustment of a motion blur amount. The motion blur removing portion 116 removes the motion blur included in the foreground component image based on the foreground component image supplied from the foreground/background separating portion 115, the motion vector and the position information thereof supplied from the motion detecting portion 112, and the unit of processing and outputs the foreground component image after the removal of the motion blur to a motion blur removed image processing portion 118.

The correcting portion 117 corrects a pixel value of a pixel corresponding to the mixture area in the background component image. A pixel value of a pixel corresponding to the mixture area in the background component image is calculated by removing the foreground component from a pixel value of a pixel of the mixture area before the separation. Therefore, a pixel value of a pixel corresponding to the mixture area in the background component image is reduced correspondingly to the mixture ratio a as compared to a pixel value of a pixel of the adjacent background area. The correcting portion 117 corrects such gain reduction corresponding to the mixture ratio a of a pixel value of a pixel corresponding to the mixture area in the background component image and supplies the corrected background component image to the motion blur removed image processing portion 118.

The motion blur removed image processing portion 118 applies an edge enhancement processing at a different edge enhancement level to each of the foreground component image after the removal of the motion blur and the corrected background component image. For the background component image, which is a still image, the edge enhancement processing is executed to enhance the edges more than the foreground component image. This enables an increase in the feeling resolution of the background component image without generating the unnatural image deterioration at the time of application of the edge enhancement processing to an image including noises.

On the other hand, for the foreground component image, the edge enhancement processing is executed at a lower edge enhancement level as compared to the background component image. This enables the reduction of the unnatural image deterioration while improving the feeling resolution even if the foreground component image after the removal of the motion blur includes noises.

DISCLOSURE OF THE INVENTION

Problems to be Solved by the Invention

However, it is problematic that the image processing device described in Japanese Laid-Open Patent Publication No. 2002-373330 needs the motion blur removing portion 116 for removing motion blurs included in the foreground component image and the correcting portion 117 that corrects pixel values of pixels corresponding to the mixture area, resulting in a very complicated processing/structure. Although this image processing device is able to remove motion blurs due to the time integration effect of an image sensor from an image having a foreground object moving relative to a still background, the image processing device is unable to remove motion blurs in other cases, for example, from an image having not only a moving image of a foreground object but also a background image moving. It is not practical if the desired effect is limited and acquired only from certain image contents as above.

It is also problematic that the image processing device described in Japanese Laid-Open Patent Publication No. 2002-373330 is unable to sufficiently improve the feeling resolution of the foreground component image since the edge enhancement level of the foreground component image is set lower because unnatural image deterioration is caused by raising the edge enhancement level when the foreground component image after the removal of the motion blur includes noise.

For example, Japanese Laid-Open Patent Publication No. 1-215185 discloses those detecting motion of an object from an input image signal to vary a contour compensation amount (edge enhancement level) for the input image signal depending on the motion detection result as those removing the motion blur due to the time integration effect of an image sensor with a simple configuration. This apparently reduces the motion blurs due to the time integration effect of an image sensor by increasing the edge enhancement level for the input image signal in the area having a larger motion amount of the input image signal and enables the improvement of sharpness of a displayed image and prevention of image quality deterioration (increase in noises in a still area) due to excessive edge enhancement.

If the motion-compensated frame rate conversion processing (FRC processing) for reducing the motion blur dues to the holding-type display system described above is combined with the edge enhancement processing that reduces the motion blurs due to the time integration effect of an image sensor, since the motion vector detection of the FRC processing is executed for an edge-enhanced image signal if the FRC processing is configured to be executed, for example, on the subsequent stage of the edge enhancement processing that reduces the motion blurs due to the time integration effect of an image sensor, it is problematic that false detection of the motion vector is induced when the vector calculation is performed based on a smooth gradient of the image signal as in the gradient method, for example.

Although the FRC processing is therefore preferably configured to be executed on the preceding stage of the edge enhancement processing, the following problem occurs in this case. The interpolation image signal generated by the FRC processing often has image deterioration (image collapse) generated due to false detection of the motion vector, etc., and if the edge enhancement processing that is the same as the edge enhancement processing for the input image signal is executed for the interpolation image signal including such image deterioration, the image deterioration tends to be enhanced and emphasized.

The present invention was conceived in view of the above situations and it is therefore the object of the present invention to provide an image display device and method and an image processing device and method capable of implementing a high-definition displayed video by reducing motion blurs due to the holding-type display system and by reducing motion blurs of a displayed video due to time integration effect of an image sensor at the same time while constraining the image deterioration.

Means for Solving the Problems

A first invention of the present application is an image display device comprising: a rate converting portion that converts the number of frames or fields of a input image signal by interpolating an interpolation image signal generated by executing motion compensation processing for the input image signal based on motion vector information between frames or fields of the input image signal between frames or fields of an input image signal, wherein the input image signal is subjected to edge enhancement processing at a first edge enhancement level and the interpolation image signal is subjected to the edge enhancement processing at a second edge enhancement level lower than the first edge enhancement level, or is not subjected to the edge enhancement processing.

A second invention of the present application is the image display device, wherein the edge enhancement processing increases an enhancement amount of a high-frequency component of the image signal for an area having a larger motion amount of the input image signal.

A third invention of the present application is the image display device, wherein the edge enhancement processing expands a frequency range of the enhanced image signal for an area having a larger motion amount of the input image signal.

A fourth invention of the present application is the image display device, wherein the image display device varies characteristics of a filter for the edge enhancement of the image signal depending on a motion direction of the input image signal.

A fifth invention of the present application is the image display device, wherein the rate converting portion includes a motion vector detecting portion that detects a motion vector between consecutive frames or fields included in the input image signal, an interpolation vector allocating portion that allocates an interpolation vector between the frames or the fields based on the detected motion vector, an interpolation image generating portion that generates an interpolation image signal based on the allocated interpolation vector, and an image interpolating portion that interpolates the generated interpolation image signal between the frames or the fields, and obtains a motion amount/motion direction of the input image signal based on the motion vector detected by the motion vector detecting portion.

A sixth invention of the present application is the image display device, wherein a low-pass filter for smoothing the motion vector detected by the motion vector detecting portion is included.

A seventh invention of the present application is the image display device, wherein the rate converting portion includes a motion vector detecting portion that detects a motion vector between consecutive frames or fields included in the input image signal, an interpolation vector allocating portion that allocates an interpolation vector between the frames or the fields based on the detected motion vector, an interpolation image generating portion that generates an interpolation image signal based on the allocated interpolation vector, and an image interpolating portion that interpolates the generated interpolation image signal between the frames or the fields, and obtains a motion amount/motion direction of the input image signal based on the interpolation vector allocated by the interpolation vector allocating portion.

An eighth invention of the present application is the image display device, wherein a low-pass filter for smoothing the interpolation vector allocated by the interpolation vector allocating portion is included.

A ninth invention of the present application is the image display device, wherein the rate converting portion interpolates a plurality of the interpolation image signals between frames or fields of the input image signal, and varies the edge enhancement level for each of the interpolation image signals depending on a temporal distance from the input image signal.

A tenth invention of the present application is an image display method comprising: a rate converting step for converting the number of frames or fields of an input image signal by interpolating an interpolation image signal generated by executing motion compensation processing for the input image signal based on motion vector information between frames or fields of the input image signal between frames or fields of the input image signal, wherein the input image signal is subjected to edge enhancement processing at a first edge enhancement level, and the interpolation image signal is subjected to the edge enhancement processing at a second edge enhancement level lower than the first edge enhancement level or is not subjected to the edge enhancement processing.

An eleventh invention of the present application is an image processing device comprising: a rate converting portion that converts the number of frames or fields of an input image signal by interpolating an interpolation image signal generated by executing motion compensation processing for the input image signal based on motion vector information between frames or fields of the input image signal between frames or fields of the input image signal, wherein the input image signal is subjected to edge enhancement processing at a first edge enhancement level, and the interpolation image signal is subjected to the edge enhancement processing at a second edge enhancement level lower than the first edge enhancement level or is not subjected to the edge enhancement processing.

A twelfth invention of the present application is an image processing method comprising: a rate converting step for converting the number of frames or fields of an input image signal by interpolating an interpolation image signal generated by executing motion compensation processing for the input image signal based on motion vector information between frames or fields of the input image signal between frames or fields of the input image signal, wherein the input image signal is subjected to edge enhancement processing at a first edge enhancement level, and the interpolation image signal is subjected to the edge enhancement processing at a second edge enhancement level lower than the first edge enhancement level or is not subjected to the edge enhancement processing.

Effect of the Invention

According to the present invention, the sharpness of displayed images may be improved without making image deterioration noticeable due to the FRC processing by making an edge enhancement level for an interpolation image signal lower than an edge enhancement level for an input image signal.

BRIEF DESCRIPTION OF DRAWINGS

FIG. 7 is an explanatory diagram of an operation of the exemplary configuration of the edge enhancing portion.

FIG. 9 is an explanatory diagram of an operation of another exemplary configuration of the edge enhancing portion.

EXPLANATIONS OF LETTERS OR NUMERALS

Figure 1:
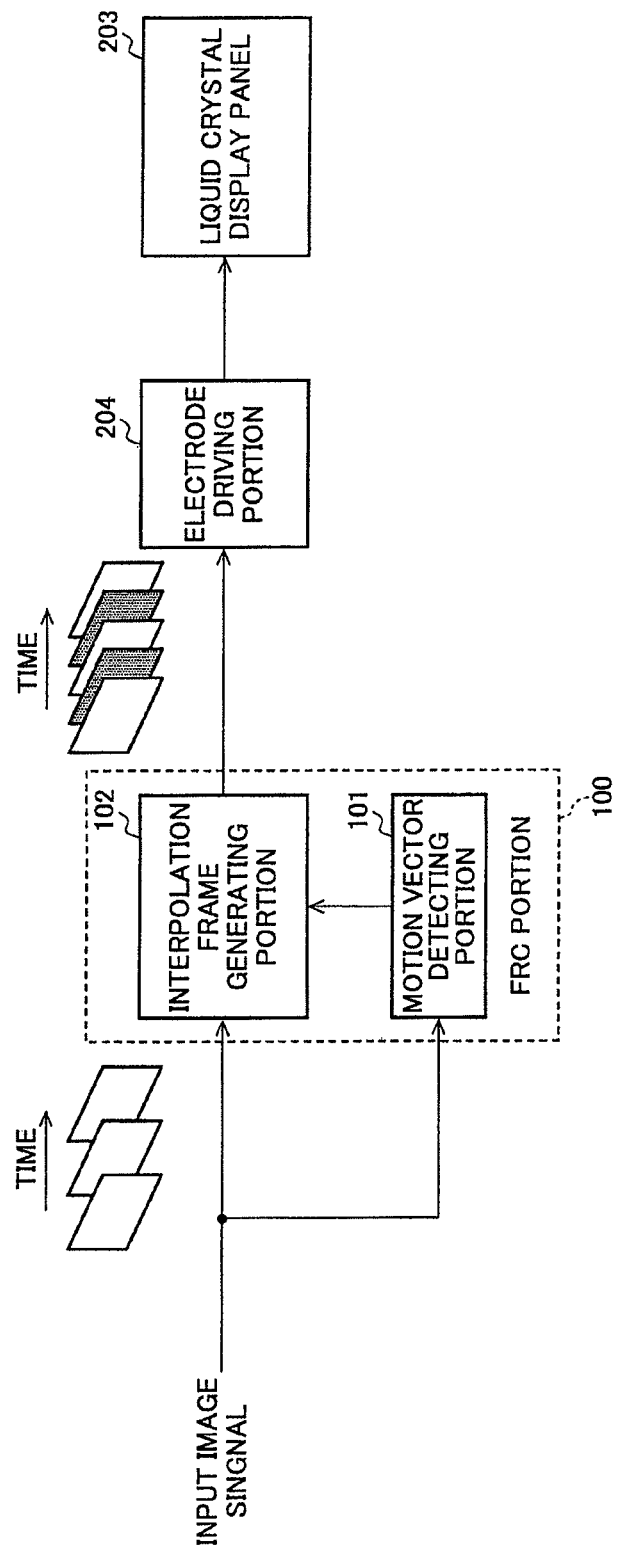
FIG. 1 is a block diagram of a schematic configuration of an FRC drive display circuit in a conventional liquid crystal display device.
Figure 2:
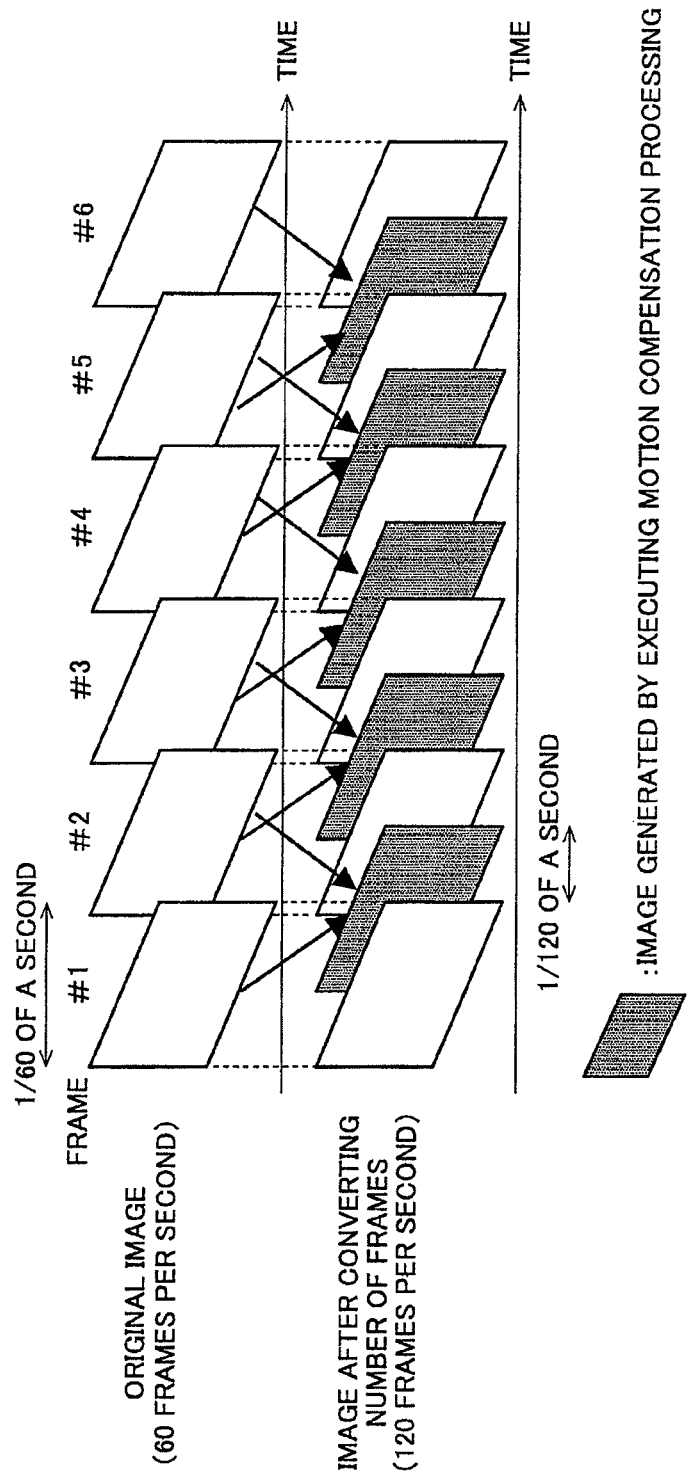
FIG. 2 is a diagram for explaining frame rate conversion processing by the conventional FRC drive display circuit shown in FIG. 1.
Figure 3:
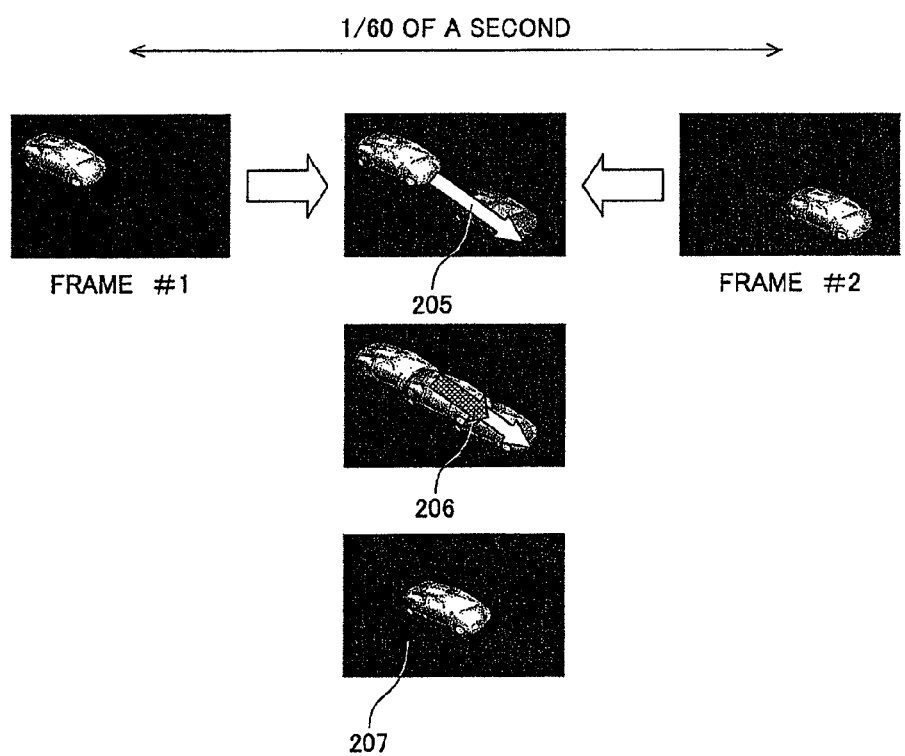
FIG. 3 is a diagram for explaining interpolation frame generation processing of a motion vector detecting portion and an interpolation frame generating portion.
Figure 4:
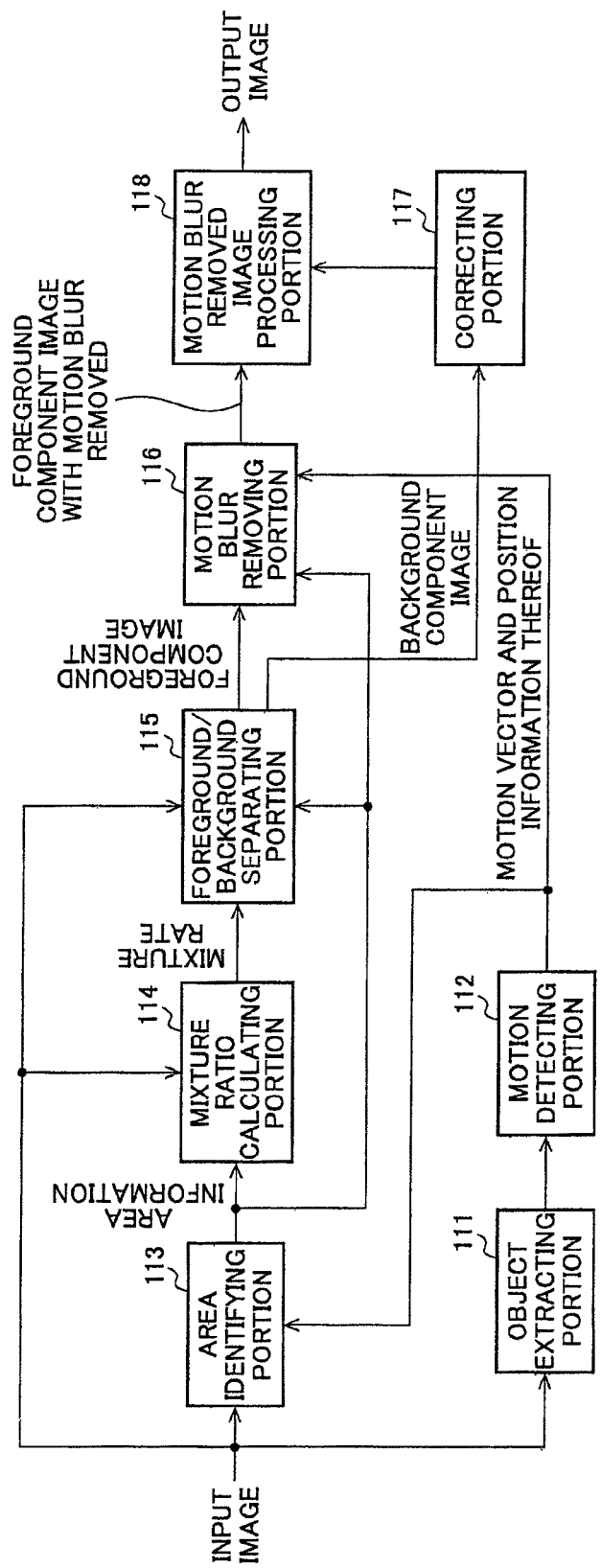
FIG. 4 is a functional block diagram of a configuration of a conventional image processing device.

1 . . . motion detecting portion; 2 . . . edge enhancing portion; 21 . . . high-pass filter; 22 . . . gain adjusting portion; 23 . . . adding portion; 24 . . . filter; 100 . . . FRC portion; 101 . . . motion vector detecting portion; 102 . . . interpolation frame generating portion; 103 . . . interpolation vector allocating portion; 104 . . . time base converting portion; 105 . . . frame buffer (FB); 106 . . . original frame vector allocating portion; 107 . . . frame buffer (FB); 111 . . . object extracting portion; 112 . . . motion detecting portion; 113 . . . area identifying portion; 114 . . . mixture ratio calculating portion; 115 . . . foreground/background separating portion; 116 . . . motion blur removing portion; 117 . . . correcting portion; 118 . . . motion blur removed image processing portion; 203 . . . liquid crystal display panel; 204 . . . electrode driving portion; 205 . . . motion vector; 206 . . . interpolation vector; and 207 . . . interpolation frame.

Preferred Embodiment Of The Invention

Preferred embodiments of an image processing device of the present invention will now be described with reference to the accompanying drawings, and the portions that are the same as those in the above conventional example are given the same reference numerals and will not be described. Although the present invention is applicable to either field signals and interpolation field signals or frame signals and interpolation frame signals, the frame signals and the interpolation frame signals will be described as a representative example since both (field and frame) are in a similar relationship to each other.

Figure 5:
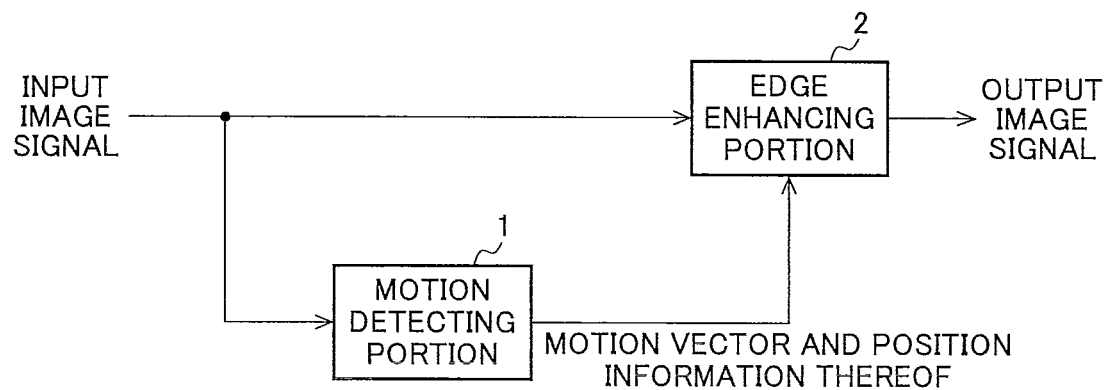
FIG. 5 is a functional block diagram of a schematic configuration of an image processing device reducing motion blurs of displayed images due to time integration effect of an image sensor.
Figure 6:
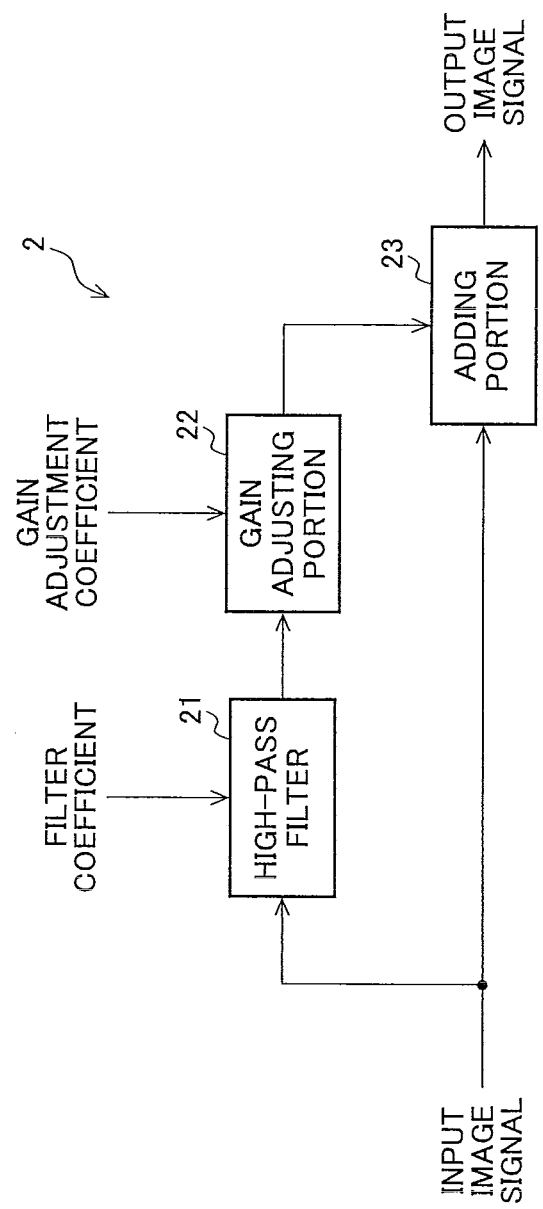
FIG. 6 is a block diagram of an exemplary configuration of an edge enhancing portion.
Figure 8:
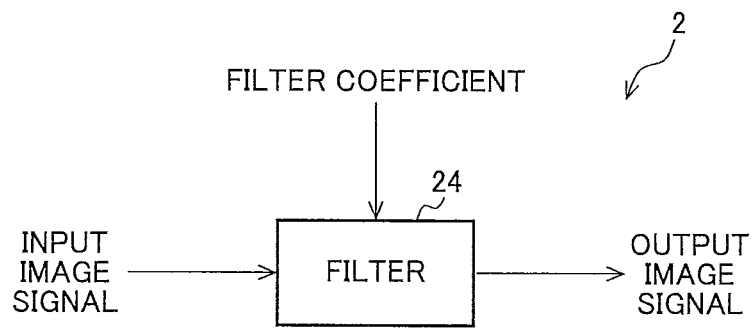
FIG. 8 is a block diagram of another exemplary configuration of the edge enhancing portion.

A configuration of an edge enhancing portion in the image processing device of the present invention will first be described with reference to FIGS. 5 to 9. FIG. 5 is a functional block diagram of a schematic configuration of an image processing device reducing motion blur of displayed images due to time integration effect of an image sensor; FIG. 6 is a block diagram of an exemplary configuration of the edge enhancing portion; FIG. 7 is an explanatory diagram of an operation of the exemplary configuration of the edge enhancing portion; FIG. 8 is a block diagram of another exemplary configuration of the edge enhancing portion; and FIG. 9 is an explanatory diagram of an operation of another exemplary configuration of the edge enhancing portion.

The image processing device reducing motion blur of displayed images due to time integration effect of an image sensor includes a motion detecting portion 1 that detects a motion amount of each of predetermined pixel areas in an input image signal and an edge enhancing portion 2 that enhances a high-frequency component of the input image signal depending on the motion amounts of the input image signal detected by the motion detecting portion 1, as shown in FIG. 5.

The motion detecting portion 1 may obtain a motion vector for each pixel or small block (e.g., a detection block consisting of 8×8 pixels) between two consecutive frames of the input image signal with the use of a block matching method, a gradient method, etc., or if motion vector information is included in the input image signal in some form, this information may be utilized. For example, the image data compression-encoded with the use of the MPEG format includes motion vector information of a moving image calculated at the time of encoding, and this motion vector information may be acquired.

The edge enhancing portion 2 varies a level and a frequency range of enhancement of the high-frequency component of the input image signal based on the motion vector detected by the motion detecting portion 1 and the position information thereof to execute an edge enhancement processing for the input image signal. The edge enhancing portion 2 may switch a level and a frequency range of enhancement of the high-frequency component of the input image signal within a screen depending on the distribution of the motion amounts of the image within the screen of the input image signal. The image signal motion-adaptively subjected to a sharpening processing by the edge enhancing portion 2 is displayed and output by a display device (not shown) such as a cathode-ray tube or a liquid crystal display panel separately or integrally configured.

Since the high-frequency component is more likely to be attenuated due to the time integration effect of an image sensor in an area having a larger motion amount of the input image signal, the edge enhancing portion 2 executes an appropriate edge enhancing processing to compensate the attenuated high-frequency component. This reduces apparent motion blurs and can improve the sharpness of displayed images.

FIG. 6 depicts an exemplary configuration of the edge enhancing portion 2. An input image signal is input to a high-pass filter 21 and an adder 23. The high-pass filter 21 extracts an image component having higher frequencies, i.e., removes an image component having lower frequencies, from the input image signal based on an input filter coefficient to generate an edge image signal. The input filter coefficient is varied stepwise depending on the motion amounts detected by the motion detecting portion 1. When the filter coefficient is varied, the high-pass filter 21 changes a frequency of the image to be extracted, a frequency of the image to be removed, and a gain of the image to be extracted.

The edge image signal generated by the high-pass filter 21 is supplied to a gain adjusting portion 22. The gain adjusting portion 22 amplifies or attenuates the edge image signal supplied from the high-pass filter 21 based on an input gain adjustment coefficient. The input gain adjustment coefficient is varied stepwise depending on the motion amounts detected by the motion detecting portion 1. When the gain adjustment coefficient is varied, the gain adjusting portion 22 changes an amplification rate (attenuation rate) of the edge image signal.

For example, the gain adjusting portion 22 amplifies the edge image signal when the gain adjustment coefficient specifying an amplification rate of one or greater is input and attenuates the edge image signal when the gain adjustment coefficient specifying an amplification rate less than one is input. The edge image signal with the gain adjusted by the gain adjusting portion 22 is supplied to the adding portion 23. The adding portion 23 adds the input image signal and the gain adjusted edge image signal supplied from the gain adjusting portion 22 to output an added image signal.

The edge enhancing portion 2 configured as above does not execute the edge enhancement processing (disables the edge enhancement processing to directly output the input image signal) in an area where the motion amount of the input image signal is zero, for example. For an area having a smaller motion amount of the input image signal, the edge enhancing portion 2 limits a frequency of the image extracted by the high-pass filter 21 to higher frequencies and constrains the amplification rate of the edge image signal of the gain adjusting portion 22 to one, as shown in FIG. 7(*a*). For an area having a larger motion amount of the input image signal, the edge enhancing portion 2 expands the frequency range of the image extracted by the high-pass filter 21 toward the lower side and makes the amplification rate of the edge image signal of the gain adjusting portion 22 greater than one, as shown in FIG. 7(*b*).

Since the high-frequency component is likely to be attenuated due to the time integration effect of an image sensor in the area having a larger motion amount of the input image signal, the apparent motion blurs may be reduced to improve the sharpness of the displayed image by increasing the edge enhancement level to compensate the attenuated high-frequency component. Since the high-frequency component tends to be attenuated in a wider range in the area having a larger motion amount of the input image signal, the apparent motion blurs may be reduced to improve the sharpness of the displayed image by expanding the enhanced frequency range of the input image signal.

Although the example of the edge enhancing portion 2 has the high-pass filter 21 and the gain adjusting portion 22, at least one of the high-pass filter 21 and the gain adjusting portion 22 may be included. The edge enhancing processing may not be executed in the area where the motion amount of the input image signal is zero since no motion blur (camera blur) occurs.

FIG. 8 depicts another exemplary configuration of the edge enhancing portion 2. In the example shown in FIG. 8, the edge enhancing portion 2 is made up of a filter 24. The filter 24 amplifies a component having higher frequencies of the input image signal based on an input filter coefficient to generate an edge-enhanced image signal. The input filter coefficient is varied stepwise depending on the motion amounts detected by the motion detecting portion 1. When the filter coefficient is varied, the filter 24 changes the gain of the high-frequency component of the input image signal.

For example, the input image signal is allowed to pass without change (the edge enhancing processing is disabled) in the area where the motion amount of the input image signal is zero. For the area having a smaller motion amount of the input image signal, the component having higher frequencies of the input image signal is amplified and doubled and the component having lower frequencies of the input image signal is allowed to pass without change to generate the edge enhanced image signal, as shown in FIG. 9(*a*). For the area having a larger motion amount of the input image signal, the component having higher frequencies of the input image signal is amplified by a factor of 2.5 and the component having lower frequencies of the input image signal is allowed to pass without change to generate the edge enhanced image signal, as shown in FIG. 9(*b*).

Since the high-frequency component is likely to be attenuated due to the time integration effect of an image sensor in the area having a larger motion amount of the input image signal, the apparent motion blurs may be reduced to improve the sharpness of the displayed image by increasing the edge enhancement level to compensate the attenuated high-frequency component. On the other hand, since the high-frequency component is less likely to be attenuated due to the time integration effect of an image sensor in the area having a smaller motion amount of the input image signal, the image quality deterioration at edge portions due to the excessive edge enhancement may be prevented by lowering the level of the edge enhancement. Since no motion blur (camera blur) occurs in the area where the motion amount of the input image signal is zero, the edge enhancement processing may not be executed. It is needless to say that the configuration of the edge enhancing portion 2 of the present invention is not limited to the above configuration.

Although a method of varying the edge enhancement level depending on the motion amounts of the input image signal is described with the above example of the image processing device, a filter characteristic, for example, a tap shape of the filter may be varied depending on the motion direction of the input image signal in addition to the motion amounts of the input image signal. For example, since the high-frequency component is not attenuated due to the time integration effect of an image sensor in a vertical direction in the image signal only having horizontal motions, it is desirable to execute the filtering processing in a horizontal direction and, therefore, if the motion vector detected from the input image signal only has a horizontal component, the tap shape of the high-pass filter 21 of FIG. 6 or the filter 24 of FIG. 8 is switched to a one-dimensional horizontal tap.

Similarly, if the motion vector detected from the input image signal only has a vertical component (if the video moves in a vertical direction), the filter may be switched to a one-dimensional vertical tap shape filter, or if the motion vector detected from the input image signal has a horizontal component and a vertical component (if the video moves in an oblique direction), the filter may be switched to a filter in a oblique-direction tap shape filter. By performing switch-over to the filter having a tap shape such as isotropic or anisotropic shape or an elliptical shape, a more ideal filtering processing becomes possible.

If a motion vector is detected on the basis of a motion detection block consisting of, for example, 8×8 pixels of the input image signal and the edge enhancement processing is controlled based on this motion vector, a different edge enhancement processing is executed for each of the 8×8-pixel block areas and, therefore, artifacts (image deteriorations) may occur at block boundaries. A method for removing such a harmful effect may include, for example, providing a low-pass filter for the motion vector between the motion detecting portion 1 and the edge enhancing portion 2 to smooth the motion vector. Smoothing a change in the motion vector within the screen may prevent the artifacts at the block boundaries generated by an abrupt change in the edge enhancement processing.

Although natural images taken by an image sensor having the time integration effect include motion blurs (camera blurs) described above, animation and CG (computer graphics) images basically have no motion blur (camera blur) as described above. If the high-frequency component is excessively enhanced in such an image including no motion blur (camera blur), image deterioration may occur in the edge portion. Therefore, if an image signal related to animation or CG is input, it is desirable to reduce the intensity of the above motion blur reduction (sharpening) processing even in the area having a larger motion amount of the input image signal.

For example, a genre type related to the input image signal may be determined based on genre information included in EPG (Electronic Program Guide) data separated and extracted from television broadcast data and, for example, if it is determined that the genre type of the input image signal is animation, the edge enhancing portion 2 may reduce the level of enhancement of the high-frequency component or narrow the enhanced frequency range or the control may be performed to disable the edge enhancement processing by the edge enhancing portion 2 even in the area having a larger motion amount of the input image signal in the same way as the area having a smaller motion amount.

Similarly, when a CG image such as a program logo, characters like a telop, and an icon is combined (overlapped) with a portion of a natural image, it is desirable to reduce the intensity of the above motion blur reduction (sharpening) processing or not to execute the processing for the area combined with the CG image even if the background natural image has a larger motion amount or if the movement speed of the CG image is high.

For example, a position of the area combined (overlapped) with a CG image such as a program logo, characters like a telop, and an icon is detected from the input image signal, and the edge enhancing portion 2 may reduce the level of enhancement of the high-frequency component or narrow the enhanced frequency range or the control may be performed to disable the edge enhancement processing by the edge enhancing portion 2 for the area combined (overlapped) with the CG image in the same way as the area having a smaller motion amount or no motion of an image.

Since the motion blurs due to the time integration effect of an image sensor vary depending on an exposure time, i.e., a shutter speed of an image sensor at the time of taking a video, it is desirable to weaken the intensity of the above motion blur reduction (sharpening) processing if the shutter speed at the time of taking an image of the input image signal is high, i.e., the exposure time is short, even when a motion amount of the input image signal is large, for example. Therefore, for example, if information related to a shutter speed at the time of taking a video is added to the television broadcast data, the information related to a shutter speed may be separated and acquired from the television broadcast data to variably control the level of enhancement of the high-frequency component by the edge enhancing portion 2 and/or the enhanced frequency range or not to execute the edge enhancement processing depending on the information related to a shutter speed.

When a video is taken, the video may be taken by focusing on the entire portion within the imaging screen or focusing on only a portion within the imaging screen in accordance with a photographer's intent. When focusing on only a portion within the imaging screen, the video is taken as an intentionally blurred video other than the object brought into focus. It is desirable to reduce the intensity of the above motion blur reduction (sharpening) processing or not to execute the motion blur reduction (sharpening) processing for such an area taken to be intentionally blurred.

When a video is taken with a focus on only a portion within the imaging screen, this is generally implemented by reducing the depth of field of a camera. The depth of field is determined by various factors such as an F-number of a camera lens, a distance between a camera and an object, and setting conditions (diaphragm, gain, and electric iris) of a camera. For example, the factors reducing the depth of field include reducing the F-number of a camera lens, shrinking the distance to the object, or opening the diaphragm. Therefore, if information related to such a depth of field is added to the television broadcast data, for example, as metadata, the information related to a depth of field is acquired from the television broadcast data and a state of the depth of field maybe determined to variably control the level of enhancement of the high-frequency component by the edge enhancing portion 2 and/or the enhanced frequency range or not to execute the edge enhancement processing depending on the determination result.

In the motion vector detection block, for example, a frequency analysis such as DCT may be performed to check an amount of the high-frequency component to detect a portion overlapped with a CG image or a portion having less motion blur regardless of fast motion in an image taken by a camera with a fast shutter speed as above. If a certain motion detection block has a large motion amount and a small high-frequency component, this is considered as a portion where motion is fast and a high-frequency component is lost by motion blurs. In other words, this is considered as a portion with many motion blurs in an image taken by a camera with a slow shutter speed rather than a portion overlapped with a CG image and a portion having less motion blur in an image taken by a camera with a fast shutter speed. Therefore, the edge enhancement processing may be executed as usual.

On the other hand, if a certain motion detection block has a large motion amount and a large high-frequency component, since this is considered to indicate the movement of a portion overlapped with a CG image or a portion having less motion blur in an image taken by a camera with a fast shutter speed, the edge enhancement level may be reduced. By analyzing the image signal and determining a motion amount and an amount of the high-frequency portion in a compounded manner as above, an appropriate intensity of the motion blur reduction processing may be determined.

Although the above image processing device is capable of implementing a high-definition displayed video by reducing motion blurs of a displayed video due to the time integration effect regardless of image contents, embodiments of the present invention will hereinafter be described for an image processing device preferably applicable to image display devices having the holding-type display characteristics such as liquid crystal displays, organic EL displays, and electrophoretic displays, i.e., an image processing device capable of implementing a high-definition displayed video by reducing both the motion blurs of a displayed video due to the time integration effect of an image sensor and the motion blurs due to the holding-type display characteristics.

(First Embodiment)

Figure 10:
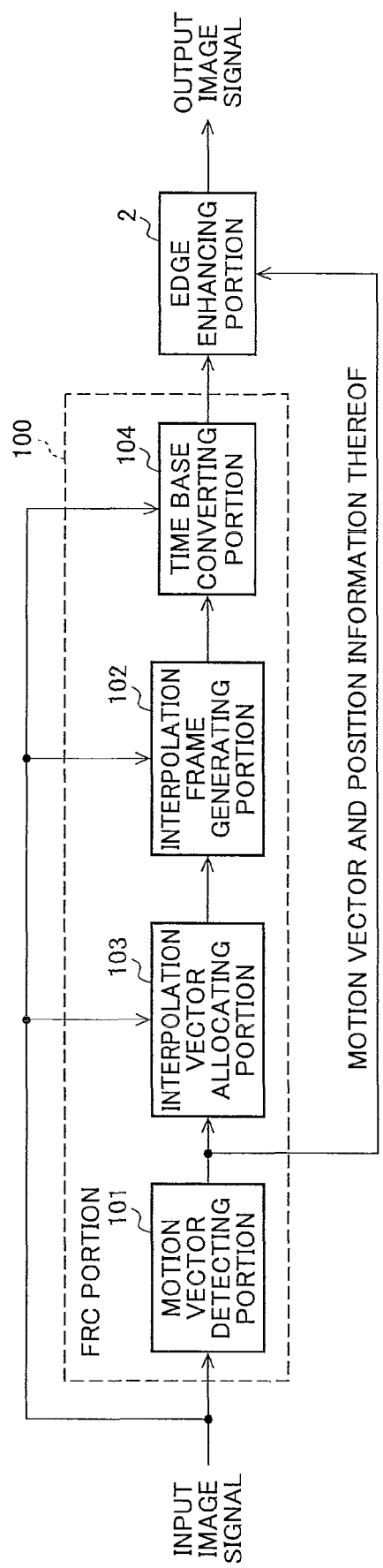
FIG. 10 is a functional block diagram of a schematic configuration of an image processing device according to a first embodiment of the present invention.

An image processing device according to a first embodiment of the present invention will be described with reference to FIG. 10, and the portions same as the above image processing device are given the same reference numerals and will not be described. FIG. 10 is a functional block diagram of a schematic configuration of the image processing device of this embodiment.

As shown in FIG. 10, the image processing device of this embodiment includes an FRC portion 100 that converts the number of frames of the input image signal by interpolating image signals subjected to a motion compensation processing between frames or fields of the input video signal and the edge enhancing portion 2 that enhances a high-frequency component of the image signal converted in the number of frames by the FRC portion 100.

The FRC portion 100 includes a motion vector detecting portion 101 that detects a motion vector from the input image signal of the previous frame and the input image signal of the current frame, an interpolation vector allocating portion 103 that evaluates the motion vectors detected by the motion vector detecting portion 101 to allocate an optimum interpolation vector to an interpolation block between frames based on the evaluation result, an interpolation frame generating portion 102 that generates an interpolation frame with the use of the input image signal of the previous frame and the input image signal of the current frame based on the interpolation vector input from the interpolation vector allocating portion 103, and a time base converting portion 104 that alternately outputs the input frames and the interpolation frames to output the image signal having the frame rate doubled from the original input image signal.

The edge enhancing portion 2 varies the level of enhancement of the high-frequency component and the enhanced frequency range based on the motion vector detected by the motion vector detecting unit 101 of the FRC portion 100 to execute the edge enhancing processing for the image signal. The motion vector detecting portion 101 of the embodiment corresponds to the motion detecting portion 1 in the image processing device described with reference to FIG. 5 and, since the high-frequency component is more likely to be attenuated due to the time integration effect of an image sensor in an area having a larger motion amount of the input image signal, the edge enhancing portion 2 executes an appropriate edge enhancing processing to compensate the attenuated high-frequency component.

The image signal motion-adaptively subjected to the sharpening processing by the edge enhancing portion 2 is displayed and output by a display device (not shown) such as a liquid crystal display panel separately or integrally configured. This enables apparent motion blurs to be reduced to improve the sharpness of the displayed image. In the case of application to the image display devices having the holding-type display characteristics, a high-definition displayed video may be implemented by reducing both the motion blurs of a displayed video due to the time integration effect of an image sensor and the motion blurs due to the holding-type display characteristics.

Although the embodiment is configured with the edge enhancing portion 2 executing the edge enhancement processing both to the input image signal and to the interpolation image signal generated by the interpolation frame generating portion 102 of the FRC portion 100, this is not a limitation and the edge enhancement processing may be executed only to the input image signal. This enables the reduction of the processing amount in the edge enhancing portion 2.

Although the embodiment is configured with the edge enhancing portion 2 executing the edge enhancement processing both to the input image signal and to the interpolation image signal generated by the interpolation frame generating portion 102 of the FRC portion 100, the edge enhancement processing to the input image signal may be different from the edge enhancement processing for the interpolation image signal.

Since image deterioration (image collapse) may occur in the interpolation image signal due to false detection of the motion vector, etc., and if the edge enhancement processing is executed to such a deteriorated interpolation image, a portion having the image deterioration is subjected to the edge enhancement processing and the image deterioration is emphasized, the motion blurs due to the time integration effect of an image sensor may apparently be reduced without making the image deterioration noticeable due to the motion-compensated frame rate conversion processing to improve the sharpness of the displayed image by making the edge enhancement level for the interpolation image signal lower than the edge enhancement level for the input image signal (original image signal) or disabling only the edge enhancement processing to the interpolation image signal.

For example, by reducing the frequency range enhanced for the interpolation image signal to be smaller than the frequency range enhanced for the input image signal (original image signal), the motion blurs due to the time integration effect of an image sensor may apparently be reduced without making the image deterioration noticeable due to the motion-compensated frame rate conversion processing to improve the sharpness of the displayed image.

Although the FRC portion 100 of the embodiment is described as a portion for converting the frame rate of the input image signal to be doubled, this is not a limitation and the FRC portion 100 may convert the frame rate of the input image signal by a factor of 1.5 or 3, or if the input image signal is generated from a movie film image, for example, a 3-2 pull-down image signal, the FRC portion 100 may convert the frame rate to 120 Hz (fivefold) by extracting a main image signal corresponding to 24 Hz (executing so-called reverse 3-2 pull-down processing) and interpolating four interpolation image signals between the frames.

Figure 11:
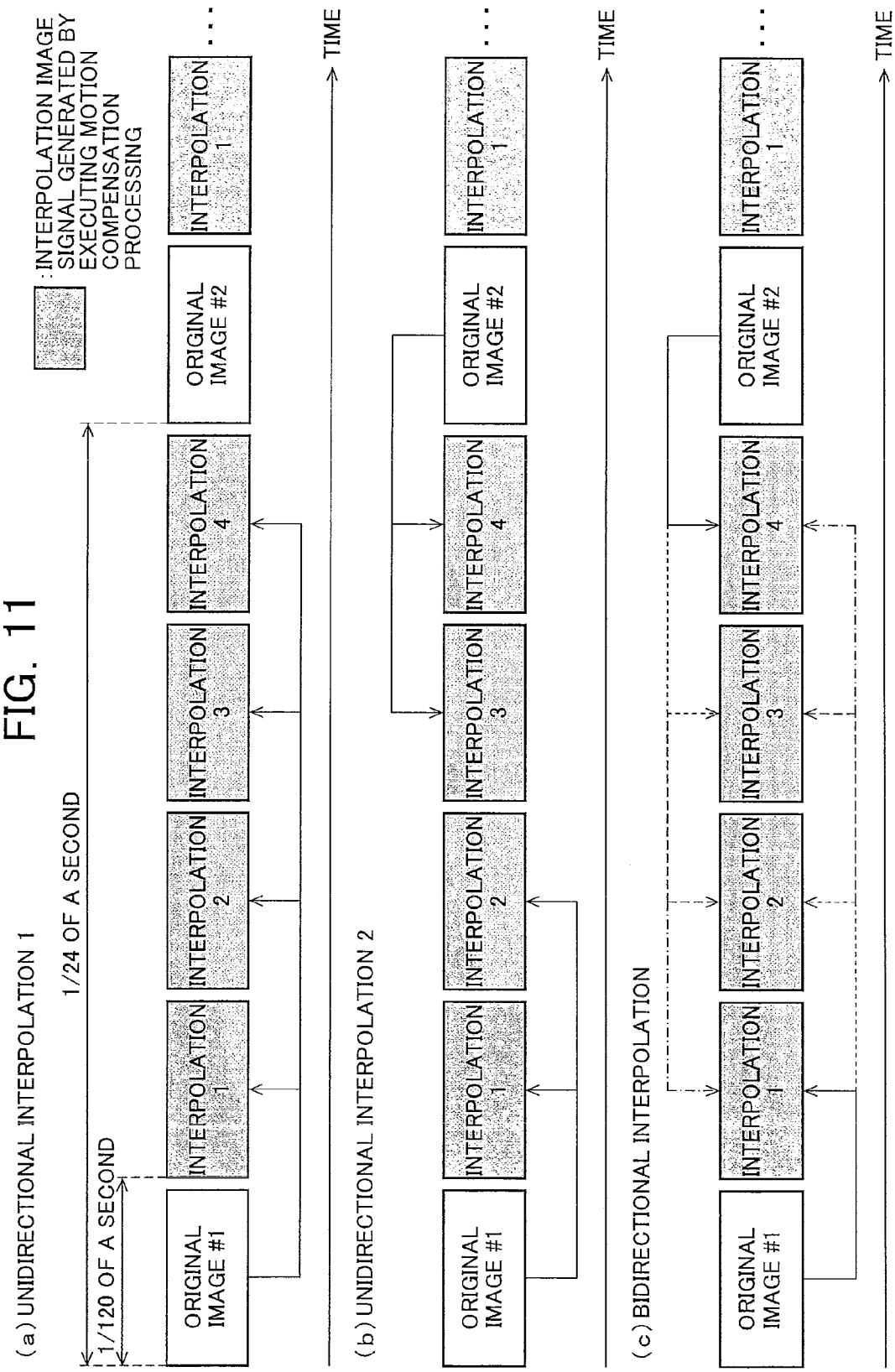
FIG. 11 is a diagram for explaining a method of generating an interpolation image signal when a frame rate is converted by a factor of five.

If a plurality of interpolation image signals are generated, the edge enhancement processing may be differentiated for each of a plurality of interpolation frames. For example, if four interpolation images are generated from a unidirectional original image as shown in FIG. 11(*a*), a fourth interpolation image temporally distant from the original image has a longer motion vector from the original image and causes a greater calculation error at the time of the motion vector detection, which may generate image deterioration of the interpolation image signal. In such a case, the motion blurs due to the time integration effect of an image sensor may apparently be reduced without making the image deterioration noticeable to improve the sharpness of the displayed image by reducing the edge enhancement level for the interpolation image signal temporally distant from the original image signal and increasing the edge enhancement level for the original image signal or the interpolation image signal temporally closer to the original image signal.

If two images of a first half of the four interpolation images are generated from the preceding original image and two images of a second half are generated from the subsequent original image as shown in FIG. 11(*b*), or if the interpolation images are generated by changing a weight adding rate or mixture rate depending on the distances from the preceding and subsequent original images as shown in FIG. 11(*c*), the motion blurs due to the time integration effect of an image sensor may apparently be reduced without making the image deterioration noticeable to improve the sharpness of the displayed image by reducing the edge enhancement level for the second and third interpolation image signals at the center because of being temporally distant from the original image signals and by increasing the edge enhancement level for the original image signal or the first and fourth interpolation image signals closer to the original image signals.

As described above, the image processing device of the embodiment is capable of apparently reducing the motion blurs due to the time integration effect of an image sensor to improve the sharpness of the displayed image and preventing the image deterioration due to excessive edge enhancement by appropriately controlling the edge enhancement processing of the edge enhancing portion 2 depending on the motion amount of the input image signal acquired by the FRC unit 100.

Since the edge enhancement processing is executed at a first edge enhancement level to the input image signal and the edge enhancement processing is executed at a second edge enhancement level lower than the first edge enhancement level or no edge enhancement processing is executed to the interpolation image signal, even if the image deterioration occurs in the interpolation image signal, the sharpness of the displayed image may be improved without making the image deterioration noticeable.

It is desirable to prevent the artifacts generated due to an abrupt change in the edge enhancement processing within a screen by providing a low-pass filter for the motion vector between the motion vector detecting portion 10 and the edge enhancing portion 2 to smooth a change in the motion vector within the screen, as described above.

In the case of this embodiment, since the edge enhancement processing is executed after the FRC processing, the motion vector detecting processing in the motion vector detecting portion 101 of the FRC portion 100 may stably operate without being affected by the edge enhancement processing. Since the motion vector information generated by the motion vector detecting portion 101 is directly used, this embodiment may be implemented with a simple configuration as compared to third and fourth embodiments described later.

However, although the original image and the interpolation image are alternately output in the output image signal of the FRC portion 100, the edge enhancing portion 2 directly applies the motion vector information generated by the FRC portion 100 both to the original image and to the interpolation image and, therefore, the accurate edge enhancing processing may not be executed to the interpolate image. Since the motion vector signal generated by the FRC portion 100 has a motion amount and a position conforming to the input image signal and not conforming to the interpolation image signal, it is desirable to execute the edge enhancing processing only to the input image signal (original image signal) if the motion vector information generated by the FRC portion 100 is used. Other methods of improving the above problem will be described later as the third and fourth embodiments.

(Second Embodiment)

Figure 12:
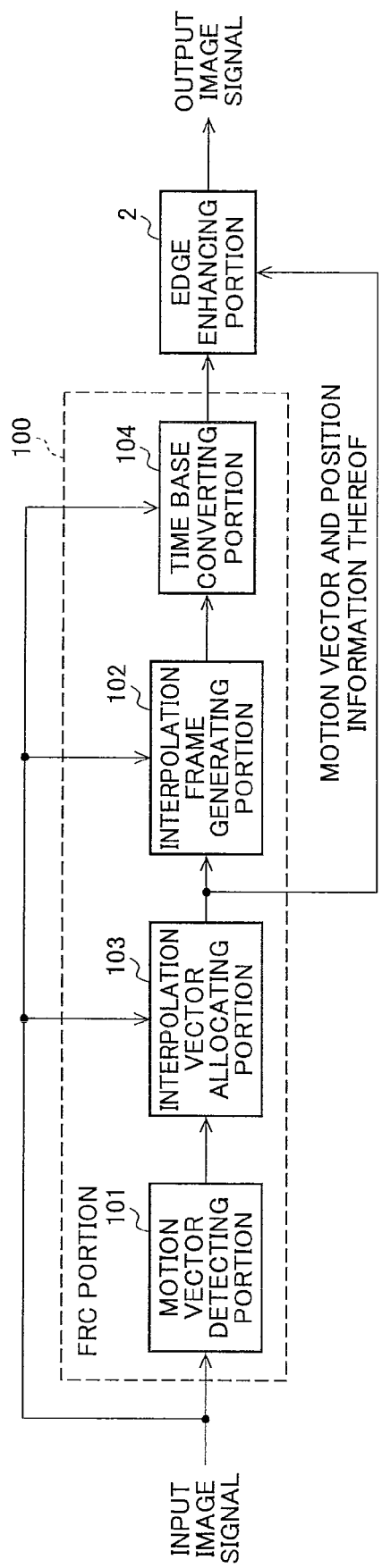
FIG. 12 is a functional block diagram of a schematic configuration of an image processing device according to a second embodiment of the present invention.

An image processing device according to a second embodiment of the present invention will be described with reference to FIG. 12, and the portions that are the same as those in the above image processing device are given the same reference numerals and will not be described. FIG. 12 is a functional block diagram of a schematic configuration of the image processing device of this embodiment.

The image processing device of this embodiment, in the same way as the first embodiment, includes the FRC portion 100 that converts the number of frames of the input image signal by interpolating image signals subjected to the motion compensation processing between frames or fields of the input video signal and the edge enhancing portion 2 that enhances a high-frequency component of the image signal converted in the number of frames by the FRC portion 100. Although the edge enhancing processing of the edge enhancing portion 2 is variably controlled based on the motion vector detected by the motion vector detecting portion 101 in the first embodiment, this embodiment is configured to variably control the edge enhancing processing of the edge enhancing portion 2 based on an interpolation vector evaluated/allocated by the interpolation vector allocating portion 103.

An interpolation vector allocation processing will be described. It is assumed that the motion vector detected by the motion vector detecting portion 101 is a motion vector for an input image signal n-1 of the previous frame. For each of the motion vector detection blocks of the input image signal n-1, the motion vector of each of the motion vector detection blocks indicates a position to which the block has moved in an input image signal n of the next frame. For example, if a frame rate is doubled, the temporal position of the interpolation frame is an intermediate position between the input image signal n-1 and the input image signal n. Therefore, processing is executed to obtain what block on the interpolation frame each of the motion vectors of the input image signal n-1 sticks in when the motion vectors are advanced to the temporal position of the interpolation frame and to allocate the motion vectors to the stuck blocks. This is the interpolation vector allocating processing to the interpolation frame.

The interpolation blocks allocated with appropriate interpolation vectors by the interpolation vector allocating portion 103 are normally set by further dividing the motion vector detection block for detecting the motion vector with the motion vector detecting unit 101. For example, if the motion vector detecting block has 8×8 pixels, the interpolation block is set to have 2×4 pixels obtained by further dividing the motion vector detecting block into eight parts.

The interpolation vector allocating portion 103 allocates a more appropriate interpolation vector to the interpolation block by calculating a difference value (referred to as DFD (Displaced Field Difference)) between image information of a detected block and image information of a block indicated by the motion vector from the detected block to evaluate the accuracy of the motion vector obtained by the motion vector detecting portion 101. The DFD is an index indicative of a degree of accuracy of a candidate vector and a smaller DFD value indicates that a detected block matches better with a block pointed by a motion vector from the detected block and that a corresponding candidate vector is more appropriate.

Therefore, since the level of enhancement of the high-frequency component by the edge enhancing portion 2 and the enhanced frequency range is varied based on the interpolation vector obtained by the interpolation vector allocating portion 103 of the FRC portion 100 in this embodiment, the edge enhancement processing may more finely and appropriately be executed at least to the interpolation image signal of the output image signal of the FRC portion 100.

Although the embodiment has a configuration that the edge enhancing portion 2 executes the edge enhancement processing both to the input image signal and to the interpolation image signal generated by the interpolation frame generating portion 102 of the FRC portion 100, this is not a limitation and the edge enhancement processing may be executed only to the input image signal. This enables the reduction of the processing amount in the edge enhancing portion 2.

Although the embodiment has a configuration that the edge enhancing portion 2 executes the edge enhancement processing both to the input image signal and to the interpolation image signal generated by the interpolation frame generating portion 102 of the FRC portion 100, the edge enhancement processing to the input image signal may be different from the edge enhancement processing to the interpolation image signal.

Since image deterioration (image collapse) may occur in the interpolation image signal due to false detection of the motion vector, etc., and if the edge enhancement processing is executed to such a deteriorated interpolation image, a portion having the image deterioration is subjected to the edge enhancement processing and the image deterioration is emphasized, the motion blurs due to the time integration effect of an image sensor may apparently be reduced without making the image deterioration noticeable due to the motion-compensated frame rate conversion processing to improve the sharpness of the displayed image by making the edge enhancement level for the interpolation image signal lower than the edge enhancement level for the input image signal (original image signal) or disabling only the edge enhancement processing to the interpolation image signal.

For example, by reducing the frequency range to be emphasized to the interpolation image signal to be smaller than the frequency range to be emphasized to the input image signal (original image signal), the motion blurs due to the time integration effect of an image sensor may apparently be reduced without making the image deterioration noticeable due to the motion-compensated frame rate conversion processing to improve the sharpness of the displayed image.

Although the FRC portion 100 of the embodiment is described as a portion converting the frame rate of the input image signal to be doubled, this is not a limitation and the FRC portion 100 may convert the frame rate of the input image signal by a factor of 1.5 or 3, or if the input image signal is generated from a movie film image, for example, a 3-2 pull-down image signal, the FRC portion 100 may convert the frame rate to 120 Hz (fivefold) by extracting a main image signal corresponding to 24 Hz (executing so-called reverse 3-2 pull-down processing) and interpolating four interpolation image signals between the frames.

If a plurality of interpolation image signals are generated, the edge enhancement processing may be differentiated for each of a plurality of interpolation frames. For example, if four interpolation images are generated from a unidirectional original image as shown in FIG. 11(*a*), a fourth interpolation image temporally distant from the original image has a longer motion vector from the original image and causes a greater calculation error at the time of the motion vector detection, which may generate image deterioration of the interpolation image signal. In such a case, the motion blurs due to the time integration effect of an image sensor may apparently be reduced without making the image deterioration noticeable to improve the sharpness of the displayed image by reducing the edge enhancement level for the interpolation image signal temporally distant from the original image signal and increasing the edge enhancement level for the original image signal or the interpolation image signal temporally closer to the original image signal.

If two images of a first half of the four interpolation images are generated from the preceding original image and two images of a second half are generated from the subsequent original image as shown in FIG. 11(*b*), or if the interpolation images are generated by changing a weight adding rate or mixture rate depending on the distances from the preceding and subsequent original images as shown in FIG. 11(*c*), the motion blurs due to the time integration effect of an image sensor may apparently be reduced without making the image deterioration noticeable to improve the sharpness of the displayed image by reducing the edge enhancement level for the second and third interpolation image signals at the center because of being temporally distant from the original image signals and by increasing the edge enhancement level for the original image signal or the first and fourth interpolation image signals closer to the original image signals.

As described above, the image processing device of the embodiment is capable of apparently reducing the motion blurs due to the time integration effect of an image sensor to improve the sharpness of the displayed image and preventing the image deterioration due to excessive edge enhancement by appropriately controlling the edge enhancement processing of the edge enhancing portion 2 depending on the motion amount of the input image signal acquired by the FRC unit 100.

Since the edge enhancement processing is executed at a first edge enhancement level to the input image signal and the edge enhancement processing is executed at a second edge enhancement level lower than the first edge enhancement level or no edge enhancement processing is executed to the interpolation image signal, even if the image deterioration occurs in the interpolation image signal, the sharpness of the displayed image may be improved without making the image deterioration noticeable.

It is desirable to prevent the artifacts generated due to an abrupt change in the edge enhancement processing within a screen by providing a low-pass filter for the motion vector between the interpolation vector allocating portion 103 and the edge enhancing portion 2 to smooth a change in the motion vector within the screen.

In the case of this embodiment, the motion vector detecting processing in the motion vector detecting portion 101 of the FRC portion 100 may be stably executed without being affected by the edge enhancement processing. Since the motion vector information allocated by the interpolation vector allocating portion 103 of the FRC portion 100 is directly used, this embodiment may be implemented with a simple configuration as compared to the third and fourth embodiments described later.

However, although the original image and the interpolation image are alternately output in the output image signal of the FRC portion 100, the edge enhancing portion 2 directly applies the interpolation vector information generated by the FRC portion 100 both to the original image and to the interpolation image and, therefore, the accurate edge enhancing processing may not be executed to the original image. Methods for improving the above problem will be described later as the third and fourth embodiments.

(Third Embodiment)

Figure 13:
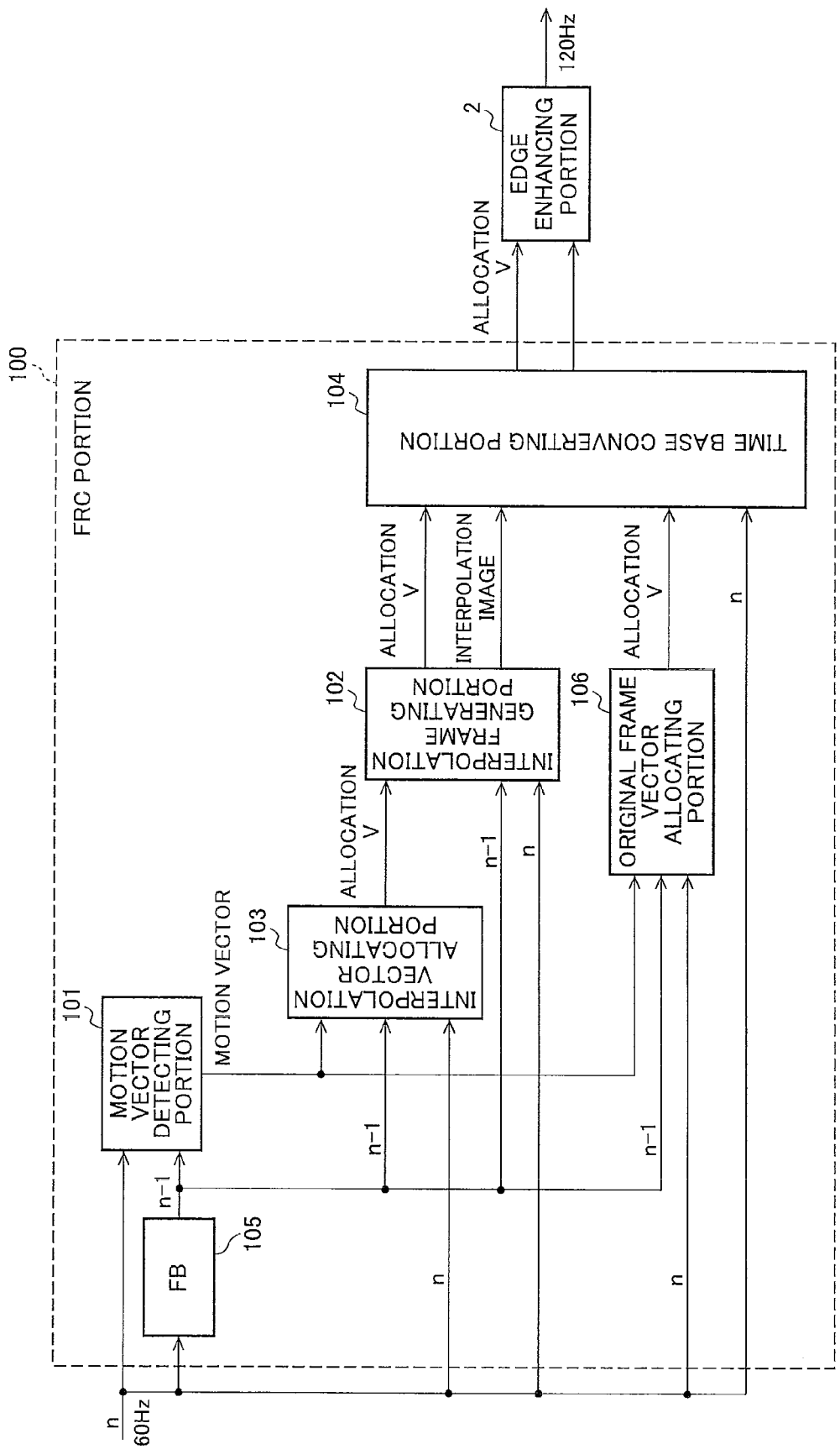
FIG. 13 is a block diagram of an exemplary configuration of an image processing device according to a third embodiment of the present invention.

An image processing device according to the third embodiment of the present invention will be described with reference to FIG. 13, and the portions same as the above image processing device are given the same reference numerals and will not be described. FIG. 13 is a block diagram of an exemplary configuration of the image processing device of this embodiment.

In FIG. 13, the motion vector detecting portion 101 obtains a motion vector for each of the motion detection blocks from the input image signal n-1 of the previous frame delayed by a frame buffer (FB) 105 and the input image signal n of the current frame. The interpolation vector allocating portion 103 uses the detected motion vector to allocate an appropriate allocation vector V to an interpolation frame. The interpolation frame generating portion 102 uses the allocated vector V to generate and output an interpolation frame image along with the vector V. An original frame vector allocating portion 106 uses the motion vector obtained by the motion vector detecting portion 101 to allocate the appropriate vector V to the original frame and outputs the allocated vector V.

The allocation of the appropriate vector V to the original frame is to execute the processing that is the same as the vector allocation processing to the interpolation frame described in detail in the second embodiment also to the original frame. Although the motion vector detected by the motion vector detecting portion 101 is originally a motion vector for the input image signal n that is the original frame, this is a vector for a motion vector detection block. The processing to reallocate the motion vector to the interpolation block is executed. If the interpolation block has the same size as the motion vector detection block, the motion vector may be used without change. If the interpolation block is smaller than the motion vector detection block, the reallocation is performed.

The time base converting portion 104 alternately outputs the interpolation frames output from the interpolation frame generating portion 102 and the original frames to output the image signal having the frame rate doubled from the original input image signal to the edge enhancing portion 2. The time base converting portion 104 outputs the allocated vector V output from the interpolation frame generating portion 102 at the same time as outputting an interpolation frame and outputs the allocated vector V output from the original frame vector allocating portion 106 at the same time as outputting an original frame.

The edge enhancing portion 2 executes the edge enhancement processing to the image signal having the converted frame rate based on the allocated vector V output from the time base converting portion 104. When the allocated vector V is larger, the edge enhancement level is more increased or the enhanced frequency range is more expanded to compensate the high-frequency component attenuated due to the time integration effect of an image sensor.

Although the embodiment has a configuration that the edge enhancing portion 2 executes the edge enhancement processing both to the interpolation image signal and to the input image signal (original image signal), this is not a limitation and the edge enhancement processing may be executed only for the input image signal. This enables the reduction of the processing amount in the edge enhancing portion 2.

Although the embodiment has a configuration that the edge enhancing portion 2 executes the edge enhancement processing both to the input image signal and to the interpolation image signal generated by the interpolation frame generating portion 102 of the FRC portion 100, the edge enhancement processing to the input image signal may be different from the edge enhancement processing to the interpolation image signal.

Since image deterioration (image collapse) may occur in the interpolation image signal due to false detection of the motion vector, etc., and if the edge enhancement processing is executed to such a deteriorated interpolation image, a portion having the image deterioration is subjected to the edge enhancement processing and the image deterioration becomes noticeable, the motion blurs due to the time integration effect of an image sensor may apparently be reduced without making the image deterioration noticeable due to the motion-compensated frame rate conversion processing to improve the sharpness of the displayed image by making the edge enhancement level for the interpolation image signal lower than the edge enhancement level for the input image signal (original image signal) or disabling only the edge enhancement processing for the interpolation image signal.

For example, by reducing the frequency range to be emphasized to the interpolation image signal to be smaller than the frequency range to be emphasized to the input image signal (original image signal), the motion blurs due to the time integration effect of an image sensor may apparently be reduced without making the image deterioration noticeable due to the motion-compensated frame rate conversion processing to improve the sharpness of the displayed image.

Although the FRC portion 100 of the embodiment is described as a portion converting the frame rate of the input image signal to be doubled, this is not a limitation and the FRC portion 100 may convert the frame rate of the input image signal by a factor of 1.5 or 3, or if the input image signal is generated from a movie film image, for example, a 3-2 pull-down image signal, the FRC portion 100 may convert the frame rate to 120 Hz (fivefold) by extracting a main image signal corresponding to 24 Hz (executing so-called reverse 3-2 pull-down processing) and interpolating four interpolation image signals between the frames.

If a plurality of interpolation image signals are generated, the edge enhancement processing may be differentiated for each of a plurality of interpolation frames. For example, if four interpolation images are generated from a unidirectional original image as shown in FIG. 11(a), a fourth interpolation image temporally distant from the original image has a longer motion vector from the original image and causes a greater calculation error at the time of the motion vector detection, which may generate image deterioration of the interpolation image signal. In such a case, the motion blurs due to the time integration effect of an image sensor may apparently be reduced without making the image deterioration noticeable to improve the sharpness of the displayed image by reducing the edge enhancement level for the interpolation image signal temporally distant from the original image signal and increasing the edge enhancement level for the original image signal or the interpolation image signal temporally closer to the original image signal.

If two images of a first half of the four interpolation images are generated from the preceding original image and two images of a second half are generated from the subsequent original image as shown in FIG. 11(b), or if the interpolation images are generated by changing a weight adding rate or mixture rate depending on the distances from the preceding and subsequent original images as shown in FIG. 11(c), the motion blurs due to the time integration effect of an image sensor may apparently be reduced without making the image deterioration noticeable to improve the sharpness of the displayed image by reducing the edge enhancement level for the second and third interpolation image signals at the center because of being temporally distant from the original image signals and by increasing the edge enhancement level for the original image signal or the first and fourth interpolation image signals closer to the original image signals.

Although the embodiment has a configuration that the motion vector detecting portion 101 detects a motion vector for an original frame n, the original frame vector allocating portion 106 allocates the motion vector to the original frame n, and the time base converting portion 104 alternately outputs the interpolation frame and the original frame n, a configuration that a motion vector is detected for an original frame n-1, the original frame vector allocating portion 106 allocates the motion vector to the original frame n-1, and the time base converting portion 104 alternately outputs the original frame n-1 and the interpolation frame may possibly employed.

As described above, the image processing device of the embodiment is capable of apparently reducing the motion blurs due to the time integration effect of an image sensor to improve the sharpness of the displayed image and preventing the image deterioration due to excessive edge enhancement since the appropriate edge enhancement processing is executed to each of the interpolation frame image signal and the original frame image signal inside the FRC unit 100 depending on the motion amount of the image.

Since the edge enhancement processing is executed at a first edge enhancement level for the input image signal and the edge enhancement processing is executed at a second edge enhancement level lower than the first edge enhancement level or no edge enhancement processing is executed to the interpolation image signal, even if the image deterioration occurs in the interpolation image signal, the sharpness of the displayed image may be improved without making the image deterioration noticeable.

In the case of this embodiment, the motion vector detecting processing in the motion vector detecting portion 101 of the FRC portion 100 may stably be executed without being affected by the edge enhancement processing. Since the edge enhancement processing is executed after the appropriate vector allocation is performed for each of the original frame and the interpolation frame, more accurate edge enhancement processing may be executed as compared to the first and second embodiments.

(Fourth Embodiment)

Figure 14:
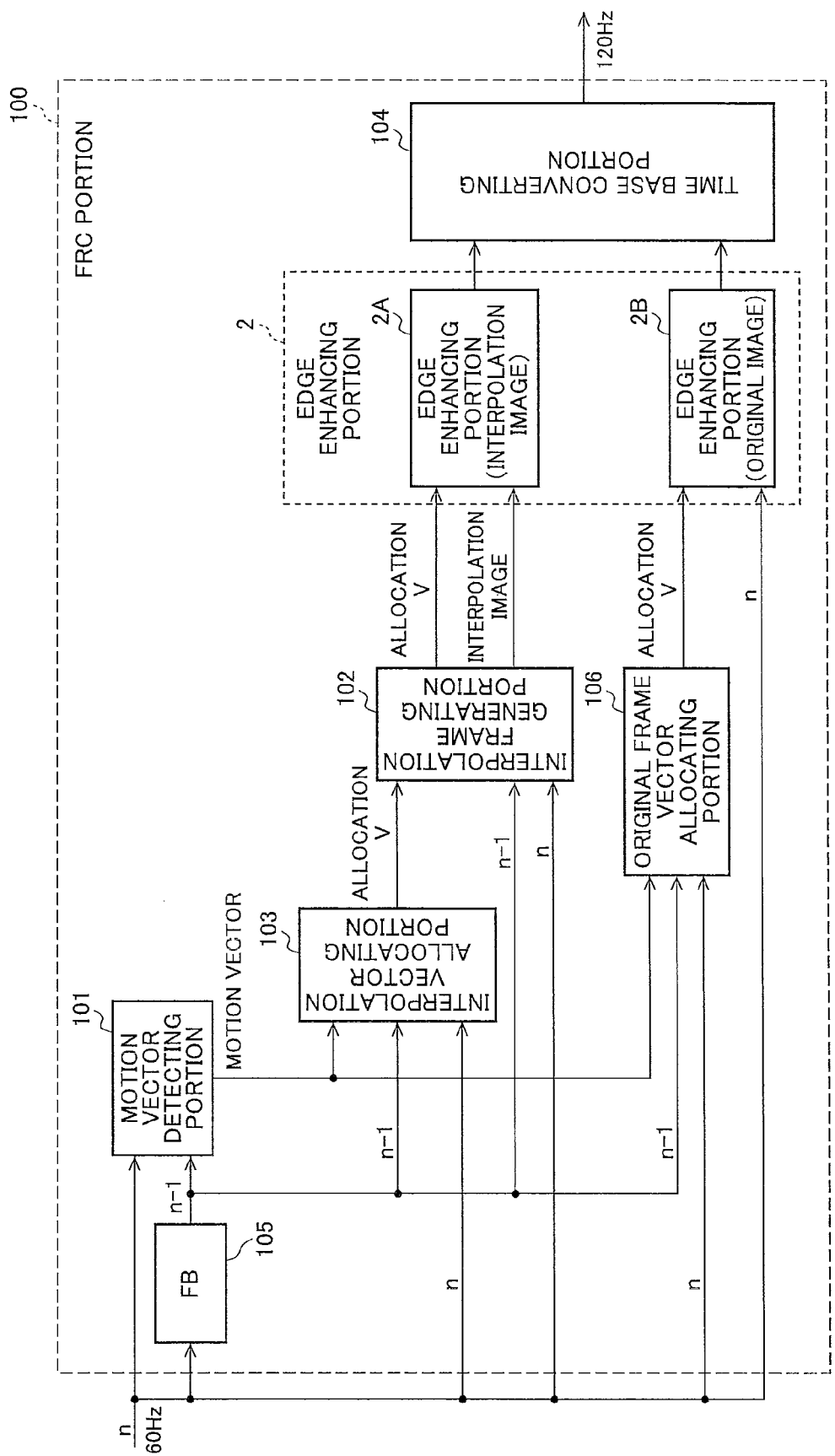
FIG. 14 is a block diagram of an exemplary configuration of an image processing device according to a fourth embodiment of the present invention.

An image processing device according to the fourth embodiment of the present invention will be described with reference to FIG. 14, and the portions same as the above image processing device are given the same reference numerals and will not be described. FIG. 14 is a block diagram of an exemplary configuration of the image processing device of this embodiment.

The image processing device of this embodiment is similar to the image processing device of the third embodiment shown in FIG. 13. Differences from the third embodiment are that the edge enhancing portion is provided inside the FRC portion 100 and increased to two edge enhancing portions 2A and 2B and that the order of the edge enhancing portion and the time base converting portion 104 is reversed.

The edge enhancing portion 2A executes the edge enhancement processing to the interpolation frame image signal based on the allocated vector V output from the interpolation frame generating portion 102. The edge enhancing portion 2B executes the edge enhancement processing to the original frame image signal based on the allocated vector V output from the original frame vector allocating portion 106. When the allocated vector V is larger, the edge enhancement level is more increased or the enhanced frequency range is more expanded to compensate the high-frequency component attenuated due to the time integration effect of an image sensor.

The time base converting portion 104 alternately outputs the interpolation frames output from the edge enhancing portion 2A and the original frames output from the edge enhancing portion 2B to output the image signal having the frame rate doubled from the original input image signal.

Although the embodiment has a configuration that the edge enhancing portion 2A and the edge enhancing portion 2B execute the edge enhancement processing both to the interpolation image signal and to the input image signal (original image signal), this is not a limitation and the edge enhancement processing may be executed only for the input image signal. For example, since image deterioration may occur in the interpolation image signal generated by the interpolation frame generating portion 102 due to false detection of the motion vector, etc., the edge enhancing portion 2A executing the edge enhancement processing for the interpolation image signal may be omitted. The configuration may be simplified by omitting the edge enhancing portion 2A as above.

Although the embodiment has a configuration that the edge enhancing portion 2A and the edge enhancing portion 2B execute the edge enhancement processing both to the input image signal and to the interpolation image signal generated by the interpolation frame generating portion 102 of the FRC portion 100, the edge enhancement processing to the input image signal may be different from the edge enhancement processing to the interpolation image signal.

Since image deterioration (image collapse) may occur in the interpolation image signal due to false detection of the motion vector, etc., and if the edge enhancement processing is executed to such a deteriorated interpolation image, a portion having the image deterioration is subjected to the edge enhancement processing and the image deterioration becomes noticeable, the motion blurs due to the time integration effect of an image sensor may apparently be reduced without making the image deterioration noticeable due to the motion-compensated frame rate conversion processing to improve the sharpness of the displayed image by making the edge enhancement level for the interpolation image signal lower than the edge enhancement level for the input image signal (original image signal) or disabling only the edge enhancement processing for the interpolation image signal.

For example, by reducing the frequency range to be emphasized to the interpolation image signal to be smaller than the frequency range to be emphasized to the input image signal (original image signal), the motion blurs due to the time integration effect of an image sensor may apparently be reduced without making the image deterioration noticeable due to the motion-compensated frame rate conversion processing to improve the sharpness of the displayed image.

Although the FRC portion 100 of the embodiment is described as a portion converting the frame rate of the input image signal to be doubled, this is not a limitation and the FRC portion 100 may convert the frame rate of the input image signal by a factor of 1.5 or 3, or if the input image signal is generated from a movie film image, for example, a 3-2 pull-down image signal, the FRC portion 100 may convert the frame rate to 120 Hz (fivefold) by extracting a main image signal corresponding to 24 Hz (executing so-called reverse 3-2 pull-down processing) and interpolating four interpolation image signals between the frames.

If a plurality of interpolation image signals are generated, the edge enhancement processing may be differentiated for each of a plurality of interpolation frames. For example, if four interpolation images are generated from a unidirectional original image as shown in FIG. 11(a), a fourth interpolation image temporally distant from the original image has a longer motion vector from the original image and causes a greater calculation error at the time of the motion vector detection, which may generate image deterioration of the interpolation image signal. In such a case, the motion blurs due to the time integration effect of an image sensor may apparently be reduced without making the image deterioration noticeable to improve the sharpness of the displayed image by reducing the edge enhancement level for the interpolation image signal temporally distant from the original image signal and increasing the edge enhancement level for the original image signal or the interpolation image signal temporally closer to the original image signal.

If two images of a first half of the four interpolation images are generated from the preceding original image and two images of a second half are generated from the subsequent original image as shown in FIG. 11(b), or if the interpolation images are generated by changing a weight adding rate or mixture rate depending on the distances from the preceding and subsequent original images as shown in FIG. 11(c), the motion blurs due to the time integration effect of an image sensor may apparently be reduced without making the image deterioration noticeable to improve the sharpness of the displayed image by reducing the edge enhancement level for the second and third interpolation image signals at the center because of being temporally distant from the original image signals and by increasing the edge enhancement level for the original image signal or the first and fourth interpolation image signals closer to the original image signals.

Although the embodiment has a configuration that the motion vector detecting portion 101 detects a motion vector for an original frame n, the original frame vector allocating portion 106 allocates the motion vector to the original frame n, and the edge enhancing portion 2B executes the edge enhancement processing to the original frame n, a configuration that a motion vector is detected for an original frame n-1, the original frame vector allocating portion 106 allocates the motion vector to the original frame n-1, and the edge enhancing portion 2B executes the edge enhancement processing for the original frame n-1 may be possibly employed.

As described above, the image processing device of the embodiment is capable of apparently reducing the motion blurs due to the time integration effect of an image sensor to improve the sharpness of the displayed image and preventing the image deterioration due to excessive edge enhancement since the appropriate edge enhancement processing is executed for each of the interpolation frame image signal and the original frame image signal inside the FRC unit 100 depending on the motion amount of the image.

Since the edge enhancement processing is executed at a first edge enhancement level for the input image signal and the edge enhancement processing is executed at a second edge enhancement level lower than the first edge enhancement level or no edge enhancement processing is executed to the interpolation image signal, even if the image deterioration occurs in the interpolation image signal, the sharpness of the displayed image may be improved without making the image deterioration noticeable.

In the case of this embodiment, the motion vector detecting processing in the motion vector detecting portion 101 of the FRC portion 100 may stably be executed without being affected by the edge enhancement processing. Since the edge enhancement processing is executed after the appropriate vector allocation is performed for each of the original frame and the interpolation frame, more accurate edge enhancement processing may be executed as compared to the first and second embodiments. Since two edge enhancing portions, i.e., the edge enhancing portion 2A and the edge enhancing portion 2B are included, the edge enhancement processing of each portion may be only half of the processing as compared to the third embodiment.

Although the exemplary embodiments of the image processing device and method of the present invention have been described in the above description, the above description will provide easy understanding of a processing program operable to drive a computer to execute the image processing method and a program recording medium that is a computer-readable recording medium recording the processing program.

As described above, the image processing device of the present invention may integrally be configured with the image display device or may separately be disposed from the image display device. Additionally, it is needless to say that the image processing device may be disposed in, for example, video output equipments such as reproducing devices for various recording mediums.

Although those varying the edge enhancement level for the image signal depending on the motion amount of the input image signal are described in the above embodiments, this is not a limitation of the present invention and it is obvious that the present invention is applicable to those executing the edge enhancement processing at a predetermined edge enhancement level. In this case, even if image deterioration occurs in the interpolation image signal, the edge enhancement level for the interpolation image signal may be made lower than the edge enhancement level for the input image signal to improve the sharpness of the displayed image without making the image deterioration noticeable.

The invention claimed is:

1. An image display device comprising:
a rate converting portion configured to convert the number of frames or fields of a input image signal by interpolating an interpolation image signal generated by executing motion compensation processing for the input image signal based on motion vector information between frames or fields of the input image signal between frames or fields of an input image signal, wherein an edge enhancement portion configured to subject the input image signal to edge enhancement processing at a first edge enhancement level and said edge enhancement portion also configured to subject the interpolation image signal to the edge enhancement processing at a second edge enhancement level lower than the first edge enhancement level, the rate converting portion includes a motion vector detecting portion that detects a motion vector between consecutive frames or fields included in the input image signal, an interpolation vector allocating portion configured to receive the detected motion vector and the input image signal and configured to allocate an interpolation vector between the frames or the fields of the input image signal based on the detected motion vector, an interpolation image generating portion configured to receive the allocated interpolation vector and the input image signal and configured to generate an interpolation image signal based on the allocated interpolation vector and input image signal, and an image interpolating portion configured to receive the generated interpolation signal and configured to interpolate the generated interpolation image signal between the frames or the fields, and configured to obtain a motion amount/motion direction of the input image signal based on the motion vector detected by the motion vector detecting portion.

2. The image display device as defined in claim 1, wherein the edge enhancement processing increases an enhancement amount of a high-frequency component of the image signal for an area having a larger motion amount of the input image signal.

3. The image display device as defined in claim 2, the image interpolating portion being further configured to obtain a motion amount/motion direction of the input image signal based on the interpolation vector allocated by the interpolation vector allocating portion.

4. The image display device as defined in claim 3, wherein a low-pass filter for smoothing the interpolation vector allocated by the interpolation vector allocating portion is included.

5. The image display device as defined in claim 1, wherein the edge enhancement processing expands a frequency range of the enhanced image signal for an area of the input image signal having a larger motion amount than another area of the input image signal.

6. The image display device as defined in claim 1, wherein the image display device varies characteristics of a filter for the edge enhancement of the image signal depending on a motion direction of the input image signal.

7. The image display device as defined in claim 1, wherein a low-pass filter for smoothing the motion vector detected by the motion vector detecting portion is included.

8. The image display device as defined in any one of claims 1,2,5,6 and 7,3,4 wherein
the rate converting portion being further configured to interpolate a plurality of the interpolation image signals between frames or fields of the input image signal, and configured to vary the edge enhancement level for each of the interpolation image signals depending on a temporal distance from the input image signal.

9. The image display device as defined in claim 1, said edge enhancement portion disabling the edge enhancement processing for the interpolation image signal.

10. The image display device as defined in claim 1, wherein the edge enhancement processing varies a level and a frequency range.

11. An image display method comprising:
a rate converting step for converting the number of frames or fields of an input image signal by interpolating an interpolation image signal generated by executing motion compensation processing for the input image signal based on motion vector information between frames or fields of the input image signal between frames or fields of the input image signal, wherein
an edge enhancement processing step subjecting the input image signal to edge enhancement processing at a first edge enhancement level, and
said edge enhancement processing step subjecting the interpolation image signal to the edge enhancement processing at a second edge enhancement level lower than the first edge enhancement level,
the rate converting step includes
a motion vector detecting step that detects a motion vector between consecutive frames or fields included in the input image signal,
an interpolation vector allocating step configured to receive the detected motion vector and the input image signal and configured to allocate an interpolation vector between the frames or the fields of the input image signal based on the detected motion vector,
an interpolation image generating step configured to receive the allocated interpolation vector and the input image signal and configured to generate an interpolation image signal based on the allocated interpolation vector and input image signal, and
an image interpolating step configured to receive the generated interpolation signal and configured to interpolate the generated interpolation image signal between the frames or the fields, and configured to obtain a motion amount/motion direction of the input image signal based on the motion vector detected by the motion vector detecting step.

12. The image display method as defined in claim 11, said edge enhancement processing step disabling the edge enhancement processing for the interpolation image signal.

13. An image processing device comprising: a rate converting portion that converts the number of frames or fields of an input image signal by interpolating an interpolation image signal generated by executing motion compensation processing for the input image signal based on motion vector information between frames or fields of the input image signal between frames or fields of the input image signal, wherein
an edge enhancement portion subjecting the input image signal to edge enhancement processing at a first edge enhancement level, and
said edge enhancement portion subjecting the interpolation image signal to the edge enhancement processing at a second edge enhancement level lower than the first edge enhancement level,
the rate converting portion includes
a motion vector detecting portion that detects a motion vector between consecutive frames or fields included in the input image signal,
an interpolation vector allocating portion configured to receive the detected motion vector and the input image signal and configured to allocate an interpolation vector between the frames or the fields of the input image signal based on the detected motion vector,
an interpolation image generating portion configured to receive the allocated interpolation vector and the input image signal and configured to generate an interpolation image signal based on the allocated interpolation vector and input image signal, and
an image interpolating portion configured to receive the generated interpolation signal and configured to interpolate the generated interpolation image signal between the frames or the fields, and configured to obtain a motion amount/motion direction of the input image signal based on the motion vector detected by the motion vector detecting portion.

14. An image processing method comprising:
a rate converting step for converting the number of frames or fields of an input image signal by interpolating an interpolation image signal generated by executing motion compensation processing for the input image signal based on motion vector information between frames or fields of the input image signal, wherein
an edge enhancement processing step subjecting the input image signal to edge enhancement processing at a first edge enhancement level, and
said edge enhancement processing step subjecting the interpolation image signal to the edge enhancement processing at a second edge enhancement level lower than the first edge enhancement level or is not subjected to the edge enhancement processing the rate converting step includes
a motion vector detecting step that detects a motion vector between consecutive frames or fields included in the input image signal,
an interpolation vector allocating step configured to receive the detected motion vector and the input image signal and configured to allocate an interpolation vector between the frames or the fields of the input image signal based on the detected motion vector,
an interpolation image generating step configured to receive the allocated interpolation vector and the input image signal and configured to generate an interpolation image signal based on the allocated interpolation vector and input image signal, and
an image interpolating step configured to receive the generated interpolation signal and configured to interpolate the generated interpolation image signal between the frames or the fields, and configured to obtain a motion amount/motion direction of the input image signal based on the motion vector detected by the motion vector detecting step.

* * * * *